US011751710B2

(12) United States Patent
Anthony

(10) Patent No.: US 11,751,710 B2
(45) Date of Patent: Sep. 12, 2023

(54) GUARD FOR COOKING SYSTEM

(71) Applicant: SHARKNINJA OPERATING LLC, Needham, MA (US)

(72) Inventor: Joshua D. Anthony, Billerica, MA (US)

(73) Assignee: SHARKNINJA OPERATING LLC, Needham, MA (US)

(*) Notice: Subject to any disclaimer, the term of this patent is extended or adjusted under 35 U.S.C. 154(b) by 677 days.

(21) Appl. No.: 16/800,476

(22) Filed: Feb. 25, 2020

(65) Prior Publication Data

US 2020/0268189 A1 Aug. 27, 2020

Related U.S. Application Data

(60) Provisional application No. 62/810,254, filed on Feb. 25, 2019.

(51) Int. Cl.

| | |
|---|---|
| ***A47J 27/00*** | (2006.01) |
| ***F24C 15/36*** | (2006.01) |
| ***A47J 37/06*** | (2006.01) |
| ***A47J 36/06*** | (2006.01) |

(52) U.S. Cl.

CPC ............ *A47J 27/002* (2013.01); *A47J 36/06* (2013.01); *A47J 37/0641* (2013.01); *A47J 37/0664* (2013.01); *F24C 15/36* (2013.01)

(58) Field of Classification Search

None

See application file for complete search history.

(56) References Cited

U.S. PATENT DOCUMENTS

| | | | |
|---|---|---|---|
| 472,002 | A | 3/1892 | Ross et al. |
| 1,254,384 | A | 1/1918 | Albro |
| 2,055,972 | A | 9/1934 | Fritsche |
| 1,986,088 | A | 1/1935 | Wild |
| 2,313,968 | A | 10/1937 | Reich |
| 2,378,950 | A | 10/1937 | Reich |
| 2,188,757 | A | 8/1938 | Moon |
| 2,253,833 | A | 12/1939 | Volks |

(Continued)

FOREIGN PATENT DOCUMENTS

| | | |
|---|---|---|
| CN | 1139304 | 1/1997 |
| CN | 2253170 Y | 4/1997 |

(Continued)

OTHER PUBLICATIONS

Canadian Application No. 3065805 filed Dec. 31, 2019; Office Action dated Mar. 12, 2020; 6 pages.

(Continued)

*Primary Examiner* — John J Norton

(74) *Attorney, Agent, or Firm* — MINTZ LEVIN COHN FERRIS GLOVSKY AND POPEO, PC

(57) ABSTRACT

A cooking system including a housing having a hollow interior, a heating element associated with said housing, a support body for supporting the food within said hollow interior such that the food is positionable on a support surface of said support body, and a guard located between at least a portion of the support surface and said heating element. The guard is permissive of convective airflow between said hollow interior and said heating element, and is generally impermeable to projectile matter generated during a cooking operation.

21 Claims, 6 Drawing Sheets

30 20 34 46 48 44 42 52 36 32

(56) References Cited

U.S. PATENT DOCUMENTS 2,235,911 A 3/1941 Wilcox
2,429,282 A 10/1947 Ness
2,430,582 A 11/1947 Reich
2,462,287 A 2/1949 Richeson et al.
2,532,639 A 12/1950 Payne
2,609,960 A * 9/1952 Irwin .................... A47J 36/064 220/521
2,622,591 A 12/1952 Bramberry
2,643,024 A * 6/1953 Cronheim ............. A47J 36/064 126/299 C
2,952,764 A 9/1960 Minami
3,076,405 A 2/1963 Lang
3,122,134 A 2/1964 Reeves
3,514,301 A 5/1970 Berger
3,529,582 A 9/1970 Hurko et al.
3,610,885 A 10/1971 Zingg
3,797,693 A * 3/1974 Baker ................... A47J 37/101 D7/391
3,807,596 A * 4/1974 Baker ................... A47J 37/101 D7/359
3,821,454 A 6/1974 Lobel
3,828,760 A 8/1974 Farber et al.
4,071,739 A 1/1978 Jenn et al.
4,091,956 A * 5/1978 Vecchio .................. A47J 36/06 220/369
4,106,486 A 8/1978 Lee
4,148,250 A 4/1979 Miki et al.
4,162,741 A 7/1979 Walker et al.
4,210,072 A 7/1980 Pedrini
4,241,288 A 12/1980 Aoshima et al.
4,268,741 A 5/1981 O'Brien
4,313,051 A 1/1982 Aoshima
4,315,138 A 2/1982 Miwa
4,374,318 A 2/1983 Gilliom
4,374,319 A 2/1983 Guibert
4,410,030 A 10/1983 Skala
4,430,557 A 2/1984 Eichelberger et al.
4,482,077 A * 11/1984 Henderson .............. A47J 36/38 126/299 C
4,484,063 A 11/1984 Whittenburg et al.
4,509,412 A 4/1985 Whittenburg et al.
4,528,975 A 7/1985 Wang
4,591,698 A 5/1986 Chang
4,622,231 A 11/1986 Swartley
4,625,097 A 11/1986 Miwa
4,670,282 A 6/1987 Onishi et al.
4,728,762 A 3/1988 Roth et al.
4,771,162 A 9/1988 Schatz
4,829,158 A 5/1989 Burnham
4,848,217 A 7/1989 Koziol
4,889,972 A 12/1989 Chang
4,995,313 A 2/1991 Delau et al.
5,000,085 A 3/1991 Archer
5,012,071 A * 4/1991 Henke ..................... A47J 36/38 219/400
5,029,519 A 7/1991 Boyen
5,031,519 A 7/1991 Toida et al.
5,036,179 A 7/1991 Westerberg et al.
5,048,400 A 9/1991 Ueda et al.
5,067,396 A 11/1991 Sorensen et al.
5,092,229 A 3/1992 Chen
5,105,725 A 4/1992 Haglund
5,205,274 A 4/1993 Smith et al.
5,251,542 A 10/1993 Itoh
5,280,749 A 1/1994 Smit
5,329,919 A 7/1994 Chang
5,355,777 A 10/1994 Chen et al.
5,416,950 A 5/1995 Dornbush et al.
5,445,061 A 8/1995 Barradas
5,466,912 A 11/1995 Dornbush et al.
5,485,780 A 1/1996 Koether et al.
5,513,558 A 5/1996 Erickson et al.
5,526,734 A 6/1996 Harrison
5,549,039 A 8/1996 Ito et al.
5,567,458 A 10/1996 Wu
5,588,352 A 12/1996 Harrison
5,590,583 A 1/1997 Harrison
5,615,607 A 4/1997 Delaquis et al.
5,619,983 A 4/1997 Smith
5,632,403 A 5/1997 Deng
5,649,476 A 7/1997 Montagnino et al.
5,676,044 A 10/1997 Lara, Jr.
5,699,722 A 12/1997 Erickson et al.
5,740,721 A 4/1998 Bizard et al.
5,768,976 A 6/1998 Suk
5,839,357 A 11/1998 Ha et al.
5,896,808 A 4/1999 Graur
5,932,130 A 8/1999 Taino
5,967,021 A 10/1999 Yung
5,970,858 A 10/1999 Boehm et al.
6,006,939 A 12/1999 Wai
6,014,986 A 1/2000 Baumgarten
6,016,797 A 1/2000 Nowicke, Jr.
6,019,029 A 2/2000 Chan
6,023,050 A 2/2000 Violi
6,060,698 A 5/2000 Petrides et al.
6,066,837 A 5/2000 McCormick et al.
6,067,896 A 5/2000 Elorza
6,070,518 A 6/2000 Kao
6,082,249 A 7/2000 Su
6,083,543 A 7/2000 Kim et al.
6,097,016 A 8/2000 Hirata et al.
6,104,004 A 8/2000 Ragland et al.
6,105,808 A 8/2000 Mendonca
6,116,151 A 9/2000 Fickert et al.
6,125,737 A 10/2000 Chang
6,135,012 A 10/2000 Kao
6,135,013 A 10/2000 Barrena
6,158,606 A 12/2000 Oliver
6,173,643 B1 1/2001 Qian et al.
6,178,876 B1 1/2001 Kao
6,191,393 B1 2/2001 Park
6,201,217 B1 3/2001 Moon et al.
6,242,025 B1 6/2001 Lesky et al.
6,252,206 B1 6/2001 Leukhardt, III et al.
6,255,630 B1 7/2001 Barnes et al.
6,257,124 B1 7/2001 Chen
6,262,396 B1 7/2001 Witt et al.
6,267,046 B1 7/2001 Wanat
6,268,592 B1 7/2001 Hu et al.
6,269,737 B1 8/2001 Rigney et al.
6,271,504 B1 8/2001 Barritt
6,283,014 B1 9/2001 Ng et al.
6,283,015 B1 9/2001 Kwon et al.
6,320,166 B1 11/2001 Park
6,355,914 B1 3/2002 Stockley
6,384,381 B2 5/2002 Witt et al.
6,393,969 B1 5/2002 Kim
D458,078 S 6/2002 Lin
6,399,925 B1 6/2002 Pickering et al.
6,414,254 B1 7/2002 McNair
6,425,320 B1 7/2002 Chameroy et al.
6,450,085 B1 9/2002 Riesselman
6,450,361 B1 9/2002 Mendelson et al.
6,455,085 B1 9/2002 Duta
6,467,645 B2 10/2002 Park
6,486,453 B1 11/2002 Bales et al.
6,494,337 B1 12/2002 Moroni
6,505,545 B2 1/2003 Kennedy et al.
6,509,550 B1 1/2003 Li
6,513,420 B1 2/2003 Park
6,523,459 B1 2/2003 Chameroy et al.
6,528,772 B1 3/2003 Graves et al.
6,540,097 B1 4/2003 Beck et al.
6,545,252 B2 4/2003 Wang
6,552,309 B1 4/2003 Kish et al.
6,559,427 B1 5/2003 Barnes et al.
6,565,903 B2 5/2003 Ng et al.
6,568,314 B1 5/2003 Stepanova
6,573,483 B1 6/2003 DeCobert et al.
6,602,530 B1 8/2003 Weber et al.
6,603,099 B2 8/2003 Gouthiere
6,604,453 B2 8/2003 Niese

(56) References Cited

U.S. PATENT DOCUMENTS 6,615,706 B1 9/2003 Wu
6,615,708 B1 9/2003 Lin
6,631,824 B2 10/2003 Park
6,669,047 B2 10/2003 Wooderson et al.
6,648,162 B1 11/2003 Wooderson et al.
6,617,554 B2 12/2003 Moon et al.
6,657,167 B2 12/2003 Loveless
6,695,319 B1 2/2004 Anota et al.
D487,212 S 3/2004 Park
6,698,337 B1 3/2004 Park
6,703,061 B2 3/2004 Kennedy et al.
6,705,209 B2 3/2004 Yang et al.
6,723,963 B2 4/2004 Ronda
6,730,881 B1 5/2004 Arntz et al.
6,730,882 B2 5/2004 Atkinson
6,730,889 B1 5/2004 Jones-Lawlor
6,736,131 B2 5/2004 Yamamoto et al.
6,740,855 B1 5/2004 DeCobert et al.
6,742,445 B2 6/2004 Backus et al.
6,747,250 B1 6/2004 Cha
6,755,319 B2 6/2004 Park
6,758,132 B1 7/2004 Kuo et al.
6,777,651 B1 8/2004 Boyer
6,782,805 B2 8/2004 Backus et al.
6,782,806 B2 8/2004 Backus et al.
6,802,429 B1 10/2004 Wildman
6,809,297 B2 10/2004 Moon et al.
6,812,433 B1 11/2004 Barritt
6,815,644 B1 11/2004 Muegge et al.
6,831,254 B2 12/2004 Barritt
6,833,534 B2 12/2004 Bellassai et al.
6,837,150 B2 1/2005 Backus et al.
6,841,762 B2 1/2005 Suzuki
6,845,707 B1 1/2005 Xu et al.
6,846,504 B1 1/2005 Yarnell
6,851,351 B2 2/2005 Payen et al.
6,872,921 B1 3/2005 DeCobert et al.
6,874,408 B2 4/2005 Backus et al.
6,877,633 B2 4/2005 Niese
6,903,310 B1 6/2005 Lee
6,917,017 B2 7/2005 Moon et al.
6,930,286 B2 8/2005 Kim
6,933,477 B2 8/2005 Becker et al.
6,935,223 B2 8/2005 Kobayashi
6,936,795 B1 8/2005 Moon et al.
6,936,801 B1 8/2005 Head
6,941,857 B2 9/2005 McLemore
6,972,397 B2 12/2005 Ha
7,009,147 B1 3/2006 Schulte
7,012,220 B2 3/2006 Boyer et al.
7,012,221 B2 3/2006 Li
7,021,203 B2 4/2006 Backus et al.
7,021,204 B2 4/2006 Backus et al.
7,024,104 B2 4/2006 Moore, Jr. et al.
7,045,745 B2 5/2006 Kim
7,053,337 B2 5/2006 Ragan et al.
7,060,941 B1 6/2006 Embury et al.
7,060,943 B2 6/2006 Hwang
7,081,601 B2 7/2006 Boyer et al.
7,082,871 B2 8/2006 Schultz
7,086,326 B2 8/2006 Yokoyama
7,087,873 B2 8/2006 Hayakawa et al.
7,091,454 B2 8/2006 Cho et al.
7,105,780 B2 9/2006 De Longhi
7,126,088 B2 10/2006 Horton et al.
7,148,451 B2 12/2006 Miyake et al.
7,154,069 B1 12/2006 Gordon
7,156,087 B1 1/2007 Churchill et al.
7,157,675 B2 1/2007 Imura
7,166,822 B1 1/2007 Chang et al.
7,171,923 B2 2/2007 Hayakawa et al.
7,208,701 B2 4/2007 Fraccon et al.
7,208,702 B2 4/2007 Choi
7,238,921 B2 7/2007 Beesley et al.
7,250,587 B2 7/2007 Ely et al.
7,250,588 B2 7/2007 Ely et al.
7,261,101 B2 8/2007 Kim
7,276,677 B1 10/2007 Shelton
7,285,751 B2 10/2007 Li et al.
7,304,271 B2 12/2007 Cho et al.
7,317,173 B2 1/2008 Bartelick et al.
7,322,279 B2 1/2008 Cartigny et al.
7,322,280 B2 1/2008 Seurat Guiochet et al.
7,325,481 B2 2/2008 Helm
7,368,688 B2 5/2008 Kim et al.
7,373,874 B2 5/2008 Seurat Guiochet et al.
7,377,208 B2 5/2008 Ho et al.
7,389,721 B2 6/2008 Wanat
7,411,159 B2 8/2008 Oosterling
7,412,922 B2 8/2008 McLemore
7,418,960 B2 9/2008 Saksena
7,451,691 B2 11/2008 Robertson
7,451,692 B2 11/2008 Baraille et al.
7,468,495 B2 12/2008 Carbone et al.
7,523,696 B2 4/2009 Seurat Guiochet et al.
7,530,302 B2 5/2009 Stephanou
7,537,004 B2 5/2009 Reay
7,565,862 B2 7/2009 Cartigny et al.
7,605,349 B2 10/2009 Gaynor et al.
D604,098 S 11/2009 Hamlin
7,619,186 B2 11/2009 Cavada et al.
7,624,674 B2 12/2009 Chameroy et al.
7,637,206 B2 12/2009 Seurat Guiochet et al.
7,669,521 B2 3/2010 Cartigny et al.
7,669,591 B2 3/2010 Fossati et al.
7,677,160 B2 3/2010 Tippmann, Sr. et al.
7,703,385 B2 4/2010 Seurat Guiochet et al.
7,718,928 B2 5/2010 He et al.
7,726,508 B2 6/2010 Hasegawa
7,745,763 B2 6/2010 Fraccon et al.
7,759,615 B2 7/2010 Ando et al.
7,762,420 B2 7/2010 Auwarter et al.
7,766,003 B2 8/2010 Kim
7,775,390 B2 8/2010 De Bastos Reis Portugal et al.
7,800,022 B2 9/2010 Kim
7,810,488 B2 10/2010 Manganiello et al.
7,838,799 B2 11/2010 Freedman
7,856,875 B2 12/2010 Jeon et al.
7,875,836 B2 1/2011 Imura et al.
7,915,568 B2 3/2011 Wang
D635,393 S 4/2011 Nakatani
7,921,768 B2 4/2011 Fernandez et al.
7,935,914 B2 5/2011 Imura
7,943,888 B2 5/2011 Barnes et al.
7,964,824 B2 6/2011 Moon
7,968,824 B2 6/2011 Lee et al.
7,980,171 B2 7/2011 Groll
8,006,684 B2 8/2011 Lee et al.
8,006,685 B2 8/2011 Bolton et al.
8,011,293 B2 9/2011 McFadden et al.
8,042,533 B2 10/2011 Dobie et al.
8,080,766 B2 12/2011 Frock et al.
8,096,436 B2 1/2012 Rhetat et al.
8,096,440 B2 1/2012 Rhetat et al.
8,152,083 B2 4/2012 Bower et al.
8,166,871 B2 5/2012 Veltrop et al.
8,205,543 B2 6/2012 Rhetat et al.
8,247,751 B2 8/2012 Jagannathan
8,258,435 B2 9/2012 Bonuso et al.
8,267,008 B2 9/2012 Yasuhara
D669,730 S 10/2012 Mandil
8,276,507 B1 10/2012 Walker
8,286,548 B2 10/2012 Krishnan et al.
8,299,404 B2 10/2012 Van Der Weij
8,302,800 B2 11/2012 Hasegawa
8,304,695 B2 11/2012 Bonuso et al.
8,330,083 B2 12/2012 Moon et al.
8,338,757 B2 12/2012 Isoda et al.
8,369,695 B2 2/2013 Lee et al.
8,378,265 B2 2/2013 Greenwood et al.
8,381,712 B1 2/2013 Simms, II
8,393,262 B1 3/2013 Molayem
8,420,983 B2 4/2013 Ohashi et al.
8,461,488 B2 6/2013 Jeong et al.

(56) References Cited

U.S. PATENT DOCUMENTS 8,517,006 B2 8/2013 Frock et al.
8,517,205 B2 8/2013 Thelen
8,525,081 B2 9/2013 Colburn et al.
8,544,381 B2 10/2013 Cartigny et al.
8,546,731 B2 10/2013 Pellerin et al.
8,561,525 B2 10/2013 Bauchot et al.
8,578,293 B2 11/2013 Breunig et al.
8,581,137 B2 11/2013 Egenter
8,601,939 B2 12/2013 Saksena et al.
8,604,394 B2 12/2013 Wu et al.
8,618,447 B2 12/2013 De'Longhi
8,637,797 B2 1/2014 Imura
D699,514 S 2/2014 Lovley, II et al.
8,640,908 B2 2/2014 Yang et al.
8,674,270 B2 3/2014 Anderson et al.
8,689,680 B2 4/2014 Park
8,695,487 B2 4/2014 Sakane et al.
8,709,905 B2 4/2014 Crayfourd
8,714,391 B2 5/2014 Milanesi
8,726,792 B2 5/2014 Shealy et al.
8,733,574 B2 5/2014 Heidrich et al.
D707,078 S 6/2014 Rivera et al.
8,739,690 B2 6/2014 Chameroy et al.
8,747,933 B1 6/2014 McGinn
8,766,144 B2 7/2014 McLoughlin et al.
8,777,038 B2 7/2014 Wen
8,783,498 B2 7/2014 Li
8,783,947 B2 7/2014 Ferron et al.
D710,647 S 8/2014 Mandil et al.
8,800,803 B2 8/2014 Stellwag
8,808,772 B2 8/2014 Lubrina et al.
8,813,635 B2 8/2014 Dragan
8,813,989 B2 8/2014 Hoffmann et al.
8,820,220 B2 9/2014 Thelen et al.
8,847,129 B2 9/2014 Kim et al.
8,869,829 B2 10/2014 Hasegawa
8,887,939 B2 11/2014 Chameroy et al.
D719,398 S 12/2014 Deters
D720,571 S 1/2015 Deters
8,931,402 B2 1/2015 Chameroy et al.
8,931,659 B2 1/2015 Rhetat et al.
8,944,272 B2 2/2015 Chameroy et al.
8,944,273 B2 2/2015 Chameroy et al.
8,946,604 B2 2/2015 Kaiser et al.
8,960,081 B2 2/2015 Beard et al.
8,973,770 B2 3/2015 He et al.
8,985,372 B2 3/2015 Yang et al.
8,991,307 B2 3/2015 Grozinger et al.
8,993,934 B2 3/2015 Giazzon et al.
D727,095 S 4/2015 Bak
9,018,566 B2 4/2015 Wang
9,027,468 B2 5/2015 Rhetat et al.
9,035,223 B2 5/2015 Noguchi et al.
9,055,618 B2 6/2015 Bunzel et al.
9,057,526 B2 6/2015 Barritt
9,066,523 B2 6/2015 Seitz et al.
9,115,905 B2 8/2015 Giazzon et al.
9,119,501 B2 9/2015 Xie
9,125,513 B2 9/2015 Kim
9,127,849 B2 9/2015 Kang et al.
9,138,106 B2 9/2015 Walker
9,173,408 B2 11/2015 Yamamoto et al.
9,177,460 B2 11/2015 Fissler
9,182,126 B2 11/2015 Cartwright et al.
9,191,998 B2 11/2015 Hegedis et al.
9,220,362 B2 12/2015 Eades et al.
9,237,829 B2 1/2016 Alet Vidal et al.
D749,906 S 2/2016 Lee
9,247,842 B2 2/2016 Cheung et al.
9,271,595 B2 3/2016 Lee
9,295,354 B2 3/2016 Sloot et al.
9,295,355 B2 3/2016 Kwag et al.
D754,469 S 4/2016 Deters
9,301,644 B2 4/2016 Payen et al.
9,314,134 B2 4/2016 Molnar
9,320,381 B2 4/2016 Chameroy et al.
9,326,633 B2 5/2016 Lin
9,339,145 B1 5/2016 Owczarzak
9,341,382 B2 5/2016 Kim
9,345,358 B2 5/2016 Zhang et al.
9,351,495 B2 5/2016 McFadden
9,353,954 B2 5/2016 Linnewiel
9,375,021 B2 6/2016 Raghavan et al.
9,414,713 B2 8/2016 Jinzhao
9,433,036 B2 8/2016 Kurtimoto et al.
9,439,530 B2 9/2016 Logan et al.
D769,058 S 10/2016 Lee
9,456,713 B2 10/2016 Backaert et al.
9,470,423 B2 10/2016 Jacob et al.
9,474,412 B2 10/2016 Fung et al.
D772,648 S 11/2016 Palermo
9,480,364 B2 11/2016 McKee et al.
D774,350 S 12/2016 Dil
D774,356 S 12/2016 Maiorana et al.
9,526,367 B2 12/2016 Anota et al.
9,545,168 B2 1/2017 Gabara
9,565,963 B2 2/2017 Jeon et al.
9,565,964 B2 2/2017 Yang et al.
9,585,509 B2 3/2017 Wassmus et al.
9,596,954 B2 3/2017 Park
9,615,408 B2 4/2017 Metz et al.
9,615,688 B2 4/2017 Shibuya et al.
9,615,691 B2 4/2017 Xiao
9,615,692 B2 4/2017 Hoffmann et al.
9,615,694 B2 4/2017 Yoshidome
9,629,499 B2 4/2017 Kim
9,629,500 B2 4/2017 Chance
9,636,618 B2 5/2017 Fung et al.
9,642,487 B1 5/2017 McGinn
9,648,975 B2 5/2017 Imura
9,648,985 B2 5/2017 Huang et al.
9,675,197 B2 6/2017 Schobloch et al.
9,681,770 B2 6/2017 Backaert et al.
9,681,773 B2 6/2017 McKee et al.
9,683,747 B2 6/2017 Raghavan et al.
9,700,172 B2 7/2017 Tanaka et al.
9,706,870 B2 7/2017 Hoehn et al.
9,706,871 B2 7/2017 Matthijs
9,717,363 B2 8/2017 Pan
9,717,364 B2 8/2017 Sladecek
9,737,936 B2 8/2017 Linglin et al.
9,743,794 B2 8/2017 Shibuya et al.
9,750,089 B2 8/2017 Wiedemann et al.
9,756,980 B1 9/2017 Li et al.
9,756,981 B2 9/2017 Fung
9,763,531 B2 9/2017 Baraille et al.
D801,106 S 10/2017 Mirchandani et al.
9,775,461 B2 10/2017 Yang et al.
9,788,678 B2 10/2017 Abe et al.
9,795,250 B2 10/2017 Huang
9,801,487 B2 10/2017 Park et al.
9,801,491 B2 10/2017 Cohade et al.
9,814,355 B2 11/2017 Winter et al.
9,841,261 B2 12/2017 Raghavan et al.
9,854,931 B2 1/2018 Rocklinger et al.
9,854,932 B2 1/2018 Tiruvallur
9,854,941 B2 1/2018 Bonaccorso
9,861,231 B2 1/2018 Kim
9,867,234 B2 1/2018 Thomann et al.
9,872,581 B2 1/2018 Braden et al.
9,872,582 B2 1/2018 Song et al.
9,877,610 B2 1/2018 Bucher et al.
9,883,768 B2 2/2018 Starflinger
9,888,811 B2 2/2018 Zwanenburg et al.
9,890,946 B2 2/2018 Shibuya et al.
9,895,028 B2 2/2018 Gerard et al.
9,900,936 B2 2/2018 Imm et al.
9,903,597 B2 2/2018 Nishijima et al.
9,907,435 B2 3/2018 Kohler et al.
9,909,764 B2 3/2018 Bach
9,924,825 B2 3/2018 Zakowski et al.
9,924,830 B1 3/2018 Glucksman et al.
D815,491 S 4/2018 Hollinger
9,930,990 B1 4/2018 Gupta et al.

(56) References Cited

U.S. PATENT DOCUMENTS 9,936,837 B1 4/2018 Granberry
D817,697 S 5/2018 Zhao
9,961,721 B2 5/2018 Guilleminot et al.
9,961,929 B2 5/2018 Olsson
9,962,029 B2 5/2018 Baraille et al.
9,980,605 B2 5/2018 De Haas et al.
10,016,085 B2 7/2018 Sapire
10,021,889 B2 7/2018 Vinett
10,022,015 B2 7/2018 Marco et al.
10,022,021 B2 7/2018 Sudhir
10,034,578 B2 7/2018 Ahmed
D824,717 S 8/2018 Allen
D826,638 S 8/2018 Zhang
10,045,651 B2 8/2018 Huang
10,047,961 B2 8/2018 Choi
10,051,986 B2 8/2018 Schultz et al.
10,051,995 B2 8/2018 Buckley et al.
10,054,317 B2 8/2018 Franzolin
10,057,946 B2 8/2018 Mills et al.
10,058,210 B2 8/2018 Palermo
10,060,632 B2 8/2018 Lim et al.
10,064,518 B2 9/2018 Xiao et al.
10,076,206 B2 9/2018 Chameroy et al.
D832,023 S 10/2018 Barberi et al.
D832,030 S 10/2018 Veldeman
10,088,371 B2 10/2018 Kaiser et al.
10,092,128 B2 10/2018 Seitz et al.
10,094,576 B2 10/2018 Kim et al.
10,098,354 B2 10/2018 Faraldi et al.
D833,204 S 11/2018 Lee
10,117,546 B2 11/2018 Le Grand
10,119,708 B2 11/2018 Bartelick et al.
10,123,556 B2 11/2018 Distaso et al.
10,123,656 B2 11/2018 Shanmugam
10,125,978 B2 11/2018 Shibuya et al.
10,130,205 B2 11/2018 Fung et al.
D834,889 S 12/2018 Moon et al.
10,143,324 B2 12/2018 Kataoka et al.
10,143,327 B2 12/2018 Freeman et al.
10,154,750 B2 12/2018 Allemand et al.
D838,548 S 1/2019 Schutte
10,172,494 B2 1/2019 Long
10,178,924 B2 1/2019 French et al.
10,194,769 B2 2/2019 Kodden
10,208,964 B2 2/2019 Cupp et al.
D842,649 S 3/2019 Mishan
10,231,291 B2 3/2019 Kim
10,231,292 B2 3/2019 Kim et al.
10,231,565 B2 3/2019 Song et al.
10,231,574 B2 3/2019 Strang
10,244,883 B2 4/2019 Chameroy et al.
10,253,989 B2 4/2019 Helm et al.
10,258,049 B2 4/2019 Engstrom
10,260,755 B2 4/2019 Bach
10,260,758 B2 4/2019 Colozzo et al.
10,260,759 B2 4/2019 Colozzo et al.
10,271,686 B2 4/2019 Roy
10,274,206 B2 4/2019 Chen
10,278,241 B2 4/2019 Shibuya et al.
10,278,532 B2 5/2019 Metz
10,281,159 B2 5/2019 Park et al.
10,288,311 B2 5/2019 Cho et al.
10,295,192 B2 5/2019 Yoshimura et al.
10,299,621 B1 5/2019 Bourgeois et al.
10,327,587 B2 6/2019 Liao
10,330,323 B2 6/2019 Kim et al.
10,342,375 B2 7/2019 Chen
10,344,988 B2 7/2019 Gattei
10,349,775 B2 7/2019 Lego et al.
10,360,812 B2 7/2019 Koennings et al.
10,368,403 B2 7/2019 Hayashi et al.
10,368,681 B2 8/2019 Kataoka et al.
10,376,087 B2 8/2019 Cornelissen
10,385,550 B2 8/2019 Lu et al.
10,390,656 B2 8/2019 Gill et al.
10,398,249 B2 9/2019 Becker et al.
10,405,686 B2 9/2019 Patel et al.
10,405,697 B2 9/2019 Gill et al.
10,405,698 B2 9/2019 Gill et al.
10,413,109 B2 9/2019 Krebs et al.
10,413,121 B2 9/2019 Gill et al.
10,413,122 B2 9/2019 Gill et al.
10,448,778 B2 10/2019 Watson et al.
10,451,290 B2 10/2019 Mayberry
10,463,186 B2 11/2019 Di Ronco et al.
10,470,609 B2 11/2019 Gerard et al.
10,470,614 B2 11/2019 Lang et al.
10,485,378 B2 11/2019 Gill et al.
10,492,637 B2 12/2019 Abe et al.
10,492,638 B2 12/2019 Guegan et al.
10,499,760 B2 12/2019 Blond
10,512,359 B2 12/2019 Xu et al.
10,517,306 B1 12/2019 Meirav
10,524,317 B2 12/2019 Kondo et al.
10,524,604 B2 1/2020 Bjork et al.
10,533,752 B2 1/2020 Faraldi et al.
10,561,273 B2 2/2020 Patel et al.
10,561,274 B2 2/2020 Huang
10,561,277 B1 2/2020 Swayne et al.
10,575,679 B1 3/2020 Cheng et al.
10,578,310 B2 3/2020 Joo et al.
10,588,445 B2 3/2020 Gustavsson
10,602,869 B2 3/2020 Yu et al.
10,638,868 B1 5/2020 Straight
10,638,869 B2 5/2020 Kataoka et al.
10,638,882 B1 5/2020 He et al.
10,645,765 B2 5/2020 Shibuya et al.
10,667,639 B2 6/2020 Mederer
10,674,855 B2 6/2020 Rosalia et al.
10,674,864 B2 6/2020 Trtic
10,687,650 B2 6/2020 Huang et al.
10,690,352 B2 6/2020 Smith et al.
10,694,753 B2 6/2020 Reese et al.
10,694,882 B2 6/2020 Huang
10,694,891 B2 6/2020 Huang
10,729,282 B2 8/2020 Bonaccorso
10,746,412 B1 8/2020 Artt
2002/0179587 A1 12/2002 Hui
2002/0185012 A1 12/2002 Yokoyama
2003/0034027 A1 2/2003 Yamamoto et al.
2003/0127447 A1 7/2003 Lin
2004/0035845 A1 2/2004 Moon et al.
2004/0045446 A1 3/2004 Park
2004/0055474 A1 3/2004 Lekic et al.
2004/0112362 A1 6/2004 Bruno et al.
2004/0124197 A1 7/2004 Hasegawa
2004/0163635 A1* 8/2004 Thorneywork ...... H05B 6/6405
219/400
2004/0216731 A1 11/2004 Personnettaz et al.
2004/0222208 A1 11/2004 Ko
2004/0253348 A1 12/2004 Woodward et al.
2005/0011370 A1 1/2005 Xu et al.
2005/0034716 A1 2/2005 Harbin
2005/0089318 A1 4/2005 Lai et al.
2005/0223906 A1 10/2005 Xu
2005/0284305 A1 12/2005 Angue
2006/0081235 A1 4/2006 Lundh et al.
2006/0156926 A1* 7/2006 Alemao .................. A61L 9/014
96/108
2007/0045284 A1 3/2007 Balk et al.
2007/0095215 A1 5/2007 Ho et al.
2007/0125768 A1 6/2007 Kim et al.
2007/0158335 A1 7/2007 Mansbery
2007/0199557 A1 8/2007 Von Kaenel, Jr.
2007/0295221 A1 12/2007 Seurat Guiochet et al.
2008/0022861 A1 1/2008 Ferron
2008/0078371 A1 4/2008 Boscaino
2008/0078755 A1 4/2008 Jeon et al.
2008/0083730 A1 4/2008 Dolgov et al.
2008/0095905 A1 4/2008 Sells et al.
2008/0099008 A1 5/2008 Bolton et al.
2008/0105137 A1 5/2008 Genslak et al.
2008/0142498 A1 6/2008 He et al.
2008/0163764 A1 7/2008 Payen et al.

(56) References Cited

U.S. PATENT DOCUMENTS

2008/0173631 A1 7/2008 Gagas et al.
2008/0206420 A1 8/2008 McFadden
2008/0213447 A1 9/2008 Payen et al.
2008/0223224 A1 9/2008 Martin
2008/0290090 A1 11/2008 Kindler et al.
2008/0314258 A1 12/2008 Martin
2009/0011101 A1 1/2009 Doherty et al.
2009/0013988 A1 1/2009 Kim et al.
2009/0032521 A1* 2/2009 Kim .................... F24C 15/322 219/400
2009/0064868 A1 3/2009 Cartossi
2009/0095166 A1 4/2009 Jian
2009/0134140 A1 5/2009 Van Der Weij
2009/0223380 A1 9/2009 Van Aken
2009/0223386 A1 9/2009 Edwards
2009/0250452 A1 10/2009 Tse
2010/0089248 A1 4/2010 Jones
2010/0136194 A1 6/2010 Schutte
2010/0147159 A1 6/2010 Fossati
2010/0147824 A1 6/2010 Bonuso et al.
2010/0206289 A1 8/2010 Larsen et al.
2010/0282097 A1 11/2010 Schulte
2011/0003048 A1 1/2011 Sugimoto et al.
2011/0095015 A1 4/2011 Kao
2011/0168158 A1 4/2011 Barkhouse
2011/0120319 A1 5/2011 Chang
2011/0126719 A1 6/2011 Valance
2011/0146653 A1 6/2011 Kitatani
2011/0147376 A1 6/2011 Ueda et al.
2011/0248020 A1 10/2011 Yuan
2011/0268153 A1 11/2011 He et al.
2012/0003364 A1 1/2012 Kling et al.
2012/0009317 A1 1/2012 McLemore
2012/0012584 A1 1/2012 Chameroy et al.
2012/0024164 A1 2/2012 Park et al.
2012/0024169 A1 2/2012 Hsu
2012/0040067 A1 2/2012 Baraille et al.
2012/0048843 A1 3/2012 Feng et al.
2012/0125313 A1 5/2012 Van Der Weij
2012/0174797 A1 7/2012 Froza
2012/0181363 A1 7/2012 Huang
2012/0192722 A1 8/2012 Foster
2012/0192726 A1 8/2012 Clearman et al.
2012/0217236 A1 8/2012 Takagi
2012/0217252 A1 8/2012 Jung
2012/0222665 A1 9/2012 Ahmed
2012/0318149 A1 12/2012 Ahmed
2013/0019759 A1 1/2013 Tumenbatur et al.
2013/0061765 A1 3/2013 Reinhart
2013/0074702 A1 3/2013 Difante
2013/0092145 A1 4/2013 Murphy et al.
2013/0104875 A1 5/2013 Schultz et al.
2013/0156906 A1 6/2013 Raghavan et al.
2013/0180413 A1 7/2013 Tjerkgaast et al.
2013/0180986 A1 7/2013 He et al.
2013/0196038 A1 8/2013 Liu
2013/0255509 A1 10/2013 He et al.
2013/0276643 A1 10/2013 Krolick et al.
2013/0298781 A1 11/2013 Ganuza et al.
2013/0305933 A1 11/2013 Heidrich et al.
2013/0333685 A1 12/2013 Jeong et al.
2014/0021191 A1 1/2014 Moon et al.
2014/0044851 A1 2/2014 Kennedy
2014/0083306 A1 3/2014 Lee
2014/0083992 A1 3/2014 Linnewiel
2014/0102315 A1 4/2014 Park
2014/0157994 A1 6/2014 Ryan et al.
2014/0175085 A1 6/2014 Yang et al.
2014/0199454 A1 7/2014 Storek et al.
2014/0199459 A1 7/2014 Jackson et al.
2014/0201688 A1 7/2014 Guilleminot et al.
2014/0220196 A1 8/2014 Veloo
2014/0227411 A1 8/2014 Popeil et al.
2014/0245898 A1 9/2014 Froza
2014/0246419 A1 9/2014 Li
2014/0251158 A1 9/2014 Yang et al.
2014/0251162 A1 9/2014 Zhou
2014/0318385 A1 10/2014 Kim
2014/0318386 A1 10/2014 Kim
2014/0318387 A1 10/2014 Kim
2014/0318388 A1 10/2014 Kim
2014/0318389 A1 10/2014 Kim
2014/0322417 A1 10/2014 Kim
2014/0348987 A1 11/2014 Cheng et al.
2014/0353316 A1 12/2014 Lin
2014/0360384 A1 12/2014 Kim
2014/0366746 A1 12/2014 Tsai
2014/0370176 A1 12/2014 Imura et al.
2014/0373729 A1 12/2014 Kim et al.
2014/0377417 A1 12/2014 Martinez
2015/0000535 A1 1/2015 Yoshidome et al.
2015/0059595 A1 3/2015 Rand et al.
2015/0083107 A1 3/2015 Busch et al.
2015/0122137 A1 5/2015 Chang
2015/0136769 A1 5/2015 Quinn et al.
2015/0173551 A1 6/2015 Carbone et al.
2015/0192289 A1 7/2015 Gattei et al.
2015/0201788 A1 7/2015 Douma et al.
2015/0201806 A1 7/2015 Yoshidome
2015/0208845 A1 7/2015 Robbins et al.
2015/0208858 A1 7/2015 Robbins et al.
2015/0223627 A1 8/2015 Li et al.
2015/0226438 A1 8/2015 Ozyurt et al.
2015/0250187 A1 9/2015 Sakane et al.
2015/0292750 A1 10/2015 Delrue et al.
2015/0305093 A1 10/2015 Smith et al.
2015/0312964 A1 10/2015 Sorenson et al.
2015/0313399 A1 11/2015 Park
2015/0351578 A1 12/2015 Song et al.
2015/0354827 A1 12/2015 Faraldi et al.
2015/0366399 A1 12/2015 Lee
2015/0366402 A1 12/2015 Wu et al.
2016/0007644 A1 1/2016 Hack et al.
2016/0007789 A1 1/2016 Tiruvallur
2016/0029829 A1 2/2016 Klein
2016/0033141 A1 2/2016 Rizzuto
2016/0037955 A1 2/2016 Kim
2016/0045067 A1 2/2016 Liao
2016/0051077 A1 2/2016 Sloot et al.
2016/0051078 A1 2/2016 Jenkins et al.
2016/0051086 A1 2/2016 De Longhi
2016/0066738 A1 3/2016 Shibuya et al.
2016/0073814 A1 3/2016 Kiriishi et al.
2016/0081509 A1 3/2016 Delrue et al.
2016/0100707 A1 4/2016 Huang
2016/0100713 A1 4/2016 De Haas et al.
2016/0113432 A1 4/2016 Cornelissen
2016/0113442 A1 4/2016 De Haas et al.
2016/0120363 A1 5/2016 Zwanenburg et al.
2016/0120364 A1 5/2016 De Haas et al.
2016/0123660 A1 5/2016 Peng
2016/0150906 A1 6/2016 Lee et al.
2016/0165676 A1 6/2016 Imm et al.
2016/0174749 A1 6/2016 Eades et al.
2016/0174764 A1 6/2016 Xiao
2016/0174771 A1 6/2016 Benoit et al.
2016/0183722 A1 6/2016 Fisher
2016/0206139 A1 6/2016 Johnson
2016/0206140 A1 6/2016 Johnson et al.
2016/0192808 A1 7/2016 Van Der Burg et al.
2016/0198882 A1 7/2016 Linglin
2016/0198883 A1 7/2016 Wang et al.
2016/0206131 A1 7/2016 Chien
2016/0219653 A1 7/2016 Kim et al.
2016/0220057 A1 8/2016 Smith et al.
2016/0235078 A1 8/2016 Farina et al.
2016/0235239 A1 8/2016 Patadia
2016/0253080 A1 9/2016 Ban et al.
2016/0270596 A1 9/2016 Allemand et al.
2016/0278563 A1 9/2016 Choudhary
2016/0278565 A1 9/2016 Chameroy et al.
2016/0281994 A1 9/2016 Nuessler
2016/0309940 A1 10/2016 Valance et al.
2016/0309956 A1 10/2016 Glucksman

(56) References Cited

U.S. PATENT DOCUMENTS

2016/0316525 A1 10/2016 Vainionpaa
2016/0316968 A1 11/2016 Linglin
2016/0324359 A1 11/2016 Aboujassoum et al.
2016/0327280 A1 11/2016 Smith et al.
2016/0345766 A1 12/2016 Sapire
2016/0353913 A1 12/2016 Chameroy et al.
2016/0353914 A1 12/2016 Chameroy et al.
2016/0353915 A1 12/2016 Chameroy et al.
2016/0353916 A1 12/2016 Chameroy et al.
2016/0360922 A1 12/2016 Xiao et al.
2016/0367061 A1 12/2016 Chou
2016/0374510 A1 12/2016 Albizuri Landazabal
2017/0000293 A1 1/2017 Sladecek et al.
2017/0016623 A1 1/2017 Rabie et al.
2017/0020334 A1 1/2017 Sorenson et al.
2017/0055770 A1 3/2017 Case
2017/0065127 A1 3/2017 Bonaccorso
2017/0071034 A1 3/2017 Metz
2017/0079475 A1 3/2017 Buckley et al.
2017/0089590 A1 3/2017 Bruin-Slot et al.
2017/0095105 A1 4/2017 Clark et al.
2017/0099977 A1 4/2017 Liu
2017/0099984 A1 4/2017 Koetz
2017/0099990 A1 4/2017 Magnouloux et al.
2017/0099995 A1 4/2017 Magnouloux
2017/0119192 A1 5/2017 Sanserverino
2017/0127871 A1 5/2017 Leung
2017/0172335 A1 6/2017 Colas et al.
2017/0181564 A1 6/2017 He et al.
2017/0199658 A1 7/2017 Stoufer et al.
2017/0224157 A1 8/2017 Rummel et al.
2017/0231257 A1 8/2017 Thul et al.
2017/0231415 A1 8/2017 Cheng et al.
2017/0231430 A1 8/2017 Moon et al.
2017/0245674 A1 8/2017 Imura
2017/0245683 A1 8/2017 Chen et al.
2017/0245686 A1 8/2017 Man
2017/0251872 A1 9/2017 Li et al.
2017/0251874 A1 9/2017 Sladecek
2017/0258268 A1 9/2017 Kazanas et al.
2017/0276378 A1 9/2017 Faraldi et al.
2017/0280914 A1 10/2017 Kumar et al.
2017/0290452 A1 10/2017 Guillaume et al.
2017/0295993 A1 10/2017 Li et al.
2017/0303740 A1 10/2017 Bonaccorso
2017/0319006 A1 11/2017 Niizumi
2017/0332823 A1 11/2017 Sanseverino
2017/0343221 A1 11/2017 Swayne et al.
2017/0360238 A1 12/2017 Bogazzi
2017/0360254 A1 12/2017 Muhr et al.
2017/0360255 A1 12/2017 Karau
2017/0367514 A1 12/2017 In ’T Groen et al.
2017/0370595 A1 12/2017 Yang et al.
2018/0000285 A1 1/2018 Backus et al.
2018/0007744 A1 1/2018 Nonaka et al.
2018/0014683 A1 1/2018 Glucksman
2018/0028017 A1 2/2018 Wu
2018/0035698 A1 2/2018 McNerney et al.
2018/0070596 A1 3/2018 Kim et al.
2018/0073739 A1 3/2018 Dumenil
2018/0078089 A1 3/2018 Sauer et al.
2018/0103796 A1 4/2018 Park
2018/0110355 A1 4/2018 Huang et al.
2018/0110373 A1 4/2018 Zhang et al.
2018/0116264 A1 5/2018 De Winter et al.
2018/0116438 A1 5/2018 He et al.
2018/0125293 A1 5/2018 McNerney et al.
2018/0125294 A1 5/2018 Conte et al.
2018/0132648 A1 5/2018 Furlanetto et al.
2018/0140126 A1 5/2018 Van Dillen
2018/0143086 A1 5/2018 Stoufer et al.
2018/0146812 A1 5/2018 Choi
2018/0153329 A1 6/2018 Glucksman et al.
2018/0160840 A1 6/2018 De’ Longhi
2018/0160849 A1 6/2018 Hebert, Jr. et al.
2018/0177322 A1 6/2018 Kim
2018/0177343 A1 6/2018 Bonaccorso
2018/0184843 A1 7/2018 Kim et al.
2018/0184848 A1 7/2018 De’ Longhi
2018/0192825 A1 7/2018 Popeil et al.
2018/0199615 A1 7/2018 Zhang et al.
2018/0199756 A1 7/2018 Huang
2018/0206672 A1 7/2018 Grace et al.
2018/0206677 A1 7/2018 Ivarsson et al.
2018/0213965 A1 8/2018 Li
2018/0220498 A1 8/2018 Jeon et al.
2018/0220842 A1 8/2018 Delrue et al.
2018/0228318 A1 8/2018 Zwanenburg et al.
2018/0235396 A1 8/2018 Schonenberger
2018/0238560 A1 8/2018 Deng et al.
2018/0255967 A1 9/2018 Haas et al.
2018/0255971 A1 9/2018 Moon et al.
2018/0263084 A1 9/2018 Yoshino et al.
2018/0263402 A1 9/2018 Li
2018/0266697 A1 9/2018 Dash et al.
2018/0270915 A1 9/2018 Koetz
2018/0271321 A1 9/2018 Delrue et al.
2018/0271322 A1 9/2018 Thai et al.
2018/0271323 A1 9/2018 Zhang et al.
2018/0279832 A1 10/2018 Ohta et al.
2018/0289212 A1 10/2018 Sladecek et al.
2018/0296019 A1 10/2018 Kim et al.
2018/0299138 A1 10/2018 Faraldi et al.
2018/0303285 A1 10/2018 Cheng
2018/0317691 A1 11/2018 Huang
2018/0317692 A1 11/2018 Huang
2018/0317693 A1 11/2018 Huang
2018/0325311 A1 11/2018 Feldman et al.
2018/0325313 A1 11/2018 De’Longhi et al.
2018/0325318 A1 11/2018 De’ Longhi et al.
2018/0325322 A1 11/2018 De’Longhi et al.
2018/0328645 A1 11/2018 Wang et al.
2018/0332993 A1 11/2018 Cho et al.
2018/0332994 A1 11/2018 Hasegawa
2018/0332999 A1 11/2018 Nie
2018/0333004 A1 11/2018 De’ Longhi et al.
2018/0333005 A1 11/2018 Fritz et al.
2018/0338636 A1 11/2018 Ceccoli
2018/0340695 A1 11/2018 Park et al.
2018/0344085 A1 12/2018 Dutter
2018/0347829 A1 12/2018 Martini et al.
2018/0353007 A1* 12/2018 Eberhart ............. A47J 37/0641
2018/0353010 A1 12/2018 Delrue et al.
2018/0359823 A1 12/2018 Shin et al.
2018/0363915 A1 12/2018 Bu
2018/0368615 A1 12/2018 Luo et al.
2019/0000267 A1 1/2019 Li et al.
2019/0003718 A1 1/2019 Lee et al.
2019/0008310 A1 1/2019 Kim et al.
2019/0008316 A1 1/2019 Kim et al.
2019/0014940 A1 1/2019 Cheung et al.
2019/0014943 A1 1/2019 Gill et al.
2019/0021142 A1 1/2019 Mizuta et al.
2019/0021537 A1 1/2019 Park
2019/0024904 A1 1/2019 Ueda et al.
2019/0029459 A1 1/2019 Gao et al.
2019/0045964 A1 2/2019 Gill et al.
2019/0045973 A1 2/2019 Gill et al.
2019/0053521 A1 2/2019 Tian et al.
2019/0053655 A1 2/2019 Panasik et al.
2019/0059627 A1 2/2019 Kitatani et al.
2019/0059628 A1 2/2019 Liu et al.
2019/0059647 A1 2/2019 Floessholzer
2019/0069706 A1 3/2019 Kim et al.
2019/0069719 A1 3/2019 Huang et al.
2019/0075956 A1 3/2019 Bang et al.
2019/0075971 A1 3/2019 Noca et al.
2019/0082876 A1 3/2019 Shi et al.
2019/0086075 A1 3/2019 Albert
2019/0099039 A1 4/2019 Li et al.
2019/0110629 A1 4/2019 Truong et al.
2019/0110638 A1 4/2019 Li et al.
2019/0117005 A1 4/2019 Kettavong et al.
2019/0120504 A1 4/2019 Lee et al.

(56) References Cited

U.S. PATENT DOCUMENTS

2019/0133364 A1 5/2019 Tian et al.
2019/0137112 A1 5/2019 Lego et al.
2019/0142215 A1 5/2019 Popeil et al.
2019/0142220 A1 5/2019 Shirali et al.
2019/0167028 A1 6/2019 Wang et al.
2019/0170361 A1 6/2019 Ha et al.
2019/0174944 A1 6/2019 Luo et al.
2019/0174945 A1 6/2019 Oti
2019/0203944 A1 7/2019 Cho et al.
2019/0215916 A1 7/2019 Yang et al.
2019/0223658 A1 7/2019 He
2019/0231125 A1 8/2019 Gill et al.
2019/0231126 A1 8/2019 Gill et al.
2019/0231127 A1 8/2019 Gill et al.
2019/0231128 A1 8/2019 Gill et al.
2019/0231129 A1 8/2019 Gill et al.
2019/0231130 A1 8/2019 Gill et al.
2019/0231131 A1 8/2019 Gill et al.
2019/0231132 A1 8/2019 Gill et al.
2019/0231133 A1 8/2019 Gill et al.
2019/0231134 A1 8/2019 Gill et al.
2019/0231135 A1 8/2019 Gill et al.
2019/0231136 A1 8/2019 Gill et al.
2019/0231137 A1 8/2019 Gill et al.
2019/0231138 A1 8/2019 Gill et al.
2019/0231139 A1 8/2019 Gill et al.
2019/0231140 A1 8/2019 Gill et al.
2019/0231141 A1 8/2019 Gill et al.
2019/0231142 A1 8/2019 Gill et al.
2019/0231143 A1 8/2019 Gill et al.
2019/0239518 A1 8/2019 McKee et al.
2019/0246829 A1 8/2019 Zhou et al.
2019/0246830 A1 8/2019 Ametepe et al.
2019/0246835 A1 8/2019 Tsai
2019/0254473 A1 8/2019 Anthony et al.
2019/0254474 A1 8/2019 Anthony et al.
2019/0254476 A1 8/2019 Anthony et al.
2019/0269272 A1 9/2019 Itzkowitz
2019/0269276 A1 9/2019 Gvili
2019/0274461 A1 9/2019 Nichols
2019/0274462 A1 9/2019 Moon
2019/0282021 A1 9/2019 Dion et al.
2019/0282029 A1 9/2019 Goldberg
2019/0290062 A1 9/2019 Prieto et al.
2019/0290072 A1 9/2019 Prieto et al.
2019/0298100 A1 10/2019 Li et al.
2019/0309955 A1 10/2019 Castillo et al.
2019/0309956 A1 10/2019 Buschman et al.
2019/0313832 A1 10/2019 Lee et al.
2019/0313833 A1 10/2019 Li et al.
2019/0313844 A1 10/2019 Nadendla et al.
2019/0316783 A1 10/2019 Lee et al.
2019/0327979 A1 10/2019 Yang et al.
2019/0328169 A1 10/2019 Fogacci
2019/0328175 A1 10/2019 Bancroft
2019/0335934 A1 11/2019 Delrue et al.
2019/0374058 A1 12/2019 Blond et al.
2019/0374064 A1 12/2019 Gill et al.
2019/0380524 A1 12/2019 Guegan et al.
2019/0381654 A1 12/2019 Oleynik
2019/0387913 A1 12/2019 Lee et al.
2019/0387921 A1 12/2019 Lemberger et al.
2019/0387922 A1 12/2019 Jin et al.
2019/0387923 A1 12/2019 Anthony et al.
2020/0000262 A1 1/2020 Delrue et al.
2020/0008601 A1 1/2020 Cao
2020/0008616 A1 1/2020 Moon
2020/0018475 A1 1/2020 Sim et al.
2020/0029721 A1 1/2020 Kang et al.
2020/0029731 A1 1/2020 Hunt
2020/0033009 A1 1/2020 Lee et al.
2020/0046157 A1 2/2020 Leung
2020/0053842 A1 2/2020 Jeon et al.
2020/0054024 A1 2/2020 Sun et al.
2020/0060472 A1 2/2020 Gill et al.
2020/0060473 A1 2/2020 Gill et al.
2020/0069113 A1 3/2020 Anthony et al.
2020/0080726 A1 3/2020 Polster
2020/0088415 A1 3/2020 Lee et al.
2020/0088443 A1 3/2020 Williams et al.
2020/0113380 A1 4/2020 Lu
2020/0121129 A1 4/2020 Wittig
2020/0128995 A1 4/2020 Patel et al.
2020/0128996 A1 4/2020 Qin et al.
2020/0128997 A1 4/2020 Qin et al.
2020/0128998 A1 4/2020 Qin et al.
2020/0138043 A1 5/2020 Hoerter
2020/0138229 A1 5/2020 Kweon et al.
2020/0138239 A1 5/2020 Gromowski et al.
2020/0146496 A1 5/2020 Patadia
2020/0146497 A1 5/2020 Shi et al.
2020/0170438 A1 6/2020 Freymiller et al.
2020/0178583 A1 6/2020 Chen et al.
2020/0182485 A1 6/2020 Ball et al.
2020/0187315 A1 6/2020 Carcano et al.
2020/0187697 A1 6/2020 Stewart et al.
2020/0187698 A1 6/2020 Peng et al.
2020/0187710 A1 6/2020 Guo et al.
2020/0187712 A1 6/2020 Gill et al.
2020/0191404 A1 6/2020 Song
2020/0205245 A1 6/2020 Ma et al.
2020/0205595 A1 7/2020 He
2020/0214500 A1 7/2020 Popeil et al.
2020/0221900 A1 7/2020 Itzkowitz
2020/0229637 A1 7/2020 Han et al.
2020/0229638 A1 7/2020 Lu
2020/0229640 A1 7/2020 Han et al.
2020/0240647 A1 7/2020 Itzkowitz et al.
2020/0253420 A1 8/2020 He et al.
2020/0260907 A1 8/2020 Lu et al.
2020/0268189 A1 8/2020 Anthony
2020/0278116 A1 9/2020 Kobayashi et al.
2020/0329908 A1 10/2020 Chen
2020/0329909 A1 10/2020 Conrad et al.
2020/0337497 A1 10/2020 Anthony et al.
2020/0405086 A1 12/2020 Dos Santos et al.
2021/0000292 A1 1/2021 Siu et al.
2021/0000296 A1 1/2021 Kennedy et al.

FOREIGN PATENT DOCUMENTS

CN 1218653 A 6/1999
CN 2358794 Y 1/2000
CN 2389593 Y 8/2000
CN 2450993 Y 10/2001
CN 2469839 Y 1/2002
CN 2479871 Y 3/2002
CN 1139352 C 2/2004
CN 1148142 C 5/2004
CN 1158963 C 7/2004
CN 2719176 Y 8/2005
CN 1820685 A 8/2006
CN 1883351 A 12/2006
CN 2855256 Y 1/2007
CN 2904903 Y 5/2007
CN 1981682 A 6/2007
CN 1985727 A 6/2007
CN 1989884 A 7/2007
CN 100998476 A 7/2007
CN 101023842 A 8/2007
CN 101053485 A 10/2007
CN 200987595 Y 12/2007
CN 101099635 A 1/2008
CN 101108064 A 1/2008
CN 101112291 A 1/2008
CN 101112292 A 1/2008
CN 101112293 A 1/2008
CN 101142448 A 3/2008
CN 101185556 A 5/2008
CN 100401957 C 7/2008
CN 101209179 A 7/2008
CN 101209180 A 7/2008
CN 201079267 Y 7/2008
CN 100425186 C 10/2008

(56) References Cited

FOREIGN PATENT DOCUMENTS

CN 100428906 C 10/2008
CN 101273834 A 10/2008
CN 201139427 Y 10/2008
CN 101322614 A 12/2008
CN 201197609 Y 2/2009
CN 100464682 C 3/2009
CN 100469289 C 3/2009
CN 201207144 Y 3/2009
CN 101432608 A 5/2009
CN 101438929 A 5/2009
CN 100496350 C 6/2009
CN 100522018 C 8/2009
CN 100531628 C 8/2009
CN 100534363 C 9/2009
CN 101518409 A 9/2009
CN 100559999 C 11/2009
CN 201365839 Y 12/2009
CN 100588351 C 2/2010
CN 101669761 A 3/2010
CN 101766439 A 7/2010
CN 101766443 A 7/2010
CN 101791190 A 8/2010
CN 101828856 A 9/2010
CN 101856086 A 10/2010
CN 201602600 U 10/2010
CN 201624512 U 11/2010
CN 101936550 A 1/2011
CN 101940273 A 1/2011
CN 101420893 B 2/2011
CN 101977536 A 2/2011
CN 201888709 U 7/2011
CN 201929758 U 8/2011
CN 201948771 U 8/2011
CN 102178443 A 9/2011
CN 102178445 A 9/2011
CN 102178464 A 9/2011
CN 201958652 U 9/2011
CN 201996364 U 10/2011
CN 101305890 B 11/2011
CN 102240164 A 11/2011
CN 102307500 A 1/2012
CN 102313306 A 2/2012
CN 102349791 A 2/2012
CN 202151310 U 2/2012
CN 102368936 A 3/2012
CN 202184614 U 4/2012
CN 101692958 B 5/2012
CN 202207075 U 5/2012
CN 202234720 U 5/2012
CN 202234761 U 5/2012
CN 202312830 U 7/2012
CN 202312886 U 7/2012
CN 102670079 A 9/2012
CN 202408428 U 9/2012
CN 202408455 U 9/2012
CN 102755120 A 10/2012
CN 102824120 A 12/2012
CN 202619362 U 12/2012
CN 102100481 B 1/2013
CN 102883641 A 1/2013
CN 202636678 U 1/2013
CN 202698888 U 1/2013
CN 103006045 A 4/2013
CN 103006092 A 4/2013
CN 202858889 U 4/2013
CN 103142128 A 6/2013
CN 103142151 A 6/2013
CN 103169371 A 6/2013
CN 103179884 A 6/2013
CN 202960194 U 6/2013
CN 202981682 U 6/2013
CN 203000535 U 6/2013
CN 103188947 A 7/2013
CN 103188970 A 7/2013
CN 103220947 A 7/2013
CN 103222807 A 7/2013
CN 203041954 U 7/2013
CN 203041955 U 7/2013
CN 102342739 B 8/2013
CN 203122175 U 8/2013
CN 103299132 A 9/2013
CN 203195497 U 9/2013
CN 203195499 U 9/2013
CN 103375826 A 10/2013
CN 203234602 U 10/2013
CN 203234613 U 10/2013
CN 102319018 B 11/2013
CN 203302862 U 11/2013
CN 203302892 U 11/2013
CN 103445669 A 12/2013
CN 102397005 B 1/2014
CN 103491830 A 1/2014
CN 203407931 U 1/2014
CN 103649643 A 3/2014
CN 203483269 U 3/2014
CN 103750730 A 4/2014
CN 203539138 U 4/2014
CN 203597771 U 5/2014
CN 203597772 U 5/2014
CN 203615383 U 5/2014
CN 203634023 U 6/2014
CN 203647141 U 6/2014
CN 203662545 U 6/2014
CN 103892696 A 7/2014
CN 103948308 A 7/2014
CN 203693372 U 7/2014
CN 203723888 U 7/2014
CN 104000478 A 8/2014
CN 203762926 U 8/2014
CN 203776718 U 8/2014
CN 203776719 U 8/2014
CN 203776729 U 8/2014
CN 203828675 U 9/2014
CN 104068757 B 10/2014
CN 203873602 U 10/2014
CN 203885286 U 10/2014
CN 104138200 A 11/2014
CN 203914511 U 11/2014
CN 203953373 U 11/2014
CN 203970073 U 12/2014
CN 203970160 U 12/2014
CN 203987492 U 12/2014
CN 203987520 U 12/2014
CN 203987550 U 12/2014
CN 203987551 U 12/2014
CN 204016055 U 12/2014
CN 204016056 U 12/2014
CN 204049362 U 12/2014
CN 204091768 U 1/2015
CN 104323708 A 2/2015
CN 104337407 A 2/2015
CN 104367182 A 2/2015
CN 204133165 U 2/2015
CN 204133291 U 2/2015
CN 204158183 U 2/2015
CN 104433841 A 3/2015
CN 204192406 U 3/2015
CN 104490294 A 4/2015
CN 102917623 B 5/2015
CN 104586233 A 5/2015
CN 104613515 A 5/2015
CN 104622274 A 5/2015
CN 104676681 A 6/2015
CN 104688019 A 6/2015
CN 104706212 A 6/2015
CN 103284618 B 7/2015
CN 104754992 A 7/2015
CN 104757872 A 7/2015
CN 104814665 A 8/2015
CN 104856561 A 8/2015
CN 104856563 A 8/2015
CN 204580991 U 8/2015
CN 104873098 A 9/2015
CN 104887063 A 9/2015

(56) References Cited

FOREIGN PATENT DOCUMENTS

CN 204636063 U 9/2015
CN 104983318 A 10/2015
CN 104997394 A 10/2015
CN 204697804 U 10/2015
CN 105011741 A 11/2015
CN 105030035 A 11/2015
CN 105054772 B 11/2015
CN 105054773 B 11/2015
CN 204734374 U 11/2015
CN 204743846 U 11/2015
CN 204765197 U 11/2015
CN 204797615 U 11/2015
CN 204797616 U 11/2015
CN 103813738 B 12/2015
CN 105105624 A 12/2015
CN 105105626 A 12/2015
CN 105167591 B 12/2015
CN 105167592 A 12/2015
CN 105193301 A 12/2015
CN 204839219 U 12/2015
CN 204889693 U 12/2015
CN 105212693 B 1/2016
CN 105212730 A 1/2016
CN 105231802 A 1/2016
CN 105231811 A 1/2016
CN 105231812 A 1/2016
CN 105231813 A 1/2016
CN 105266565 A 1/2016
CN 105266577 A 1/2016
CN 204995259 U 1/2016
CN 105286491 A 2/2016
CN 105286496 A 2/2016
CN 105286498 A 2/2016
CN 105286627 A 2/2016
CN 105326332 A 2/2016
CN 105342454 A 2/2016
CN 205018872 U 2/2016
CN 205018878 U 2/2016
CN 105380512 A 3/2016
CN 105380513 A 3/2016
CN 105380514 A 3/2016
CN 105411378 A 3/2016
CN 105411379 A 3/2016
CN 105433778 A 3/2016
CN 105433779 A 3/2016
CN 105451610 A 3/2016
CN 105455628 A 4/2016
CN 105455664 A 4/2016
CN 105455671 A 4/2016
CN 105476461 A 4/2016
CN 105476464 A 4/2016
CN 105476472 A 4/2016
CN 105476491 A 4/2016
CN 105496184 A 4/2016
CN 105496185 A 4/2016
CN 105496224 A 4/2016
CN 205126014 U 4/2016
CN 105534269 A 5/2016
CN 105559571 A 5/2016
CN 105595792 A 5/2016
CN 105595802 A 5/2016
CN 105595803 A 5/2016
CN 205197727 U 5/2016
CN 205214967 U 5/2016
CN 205215045 U 5/2016
CN 102440681 B 6/2016
CN 102783908 B 6/2016
CN 103648337 B 6/2016
CN 105615638 A 6/2016
CN 105615639 A 6/2016
CN 105615686 A 6/2016
CN 105640299 A 6/2016
CN 105640302 A 6/2016
CN 105640309 A 6/2016
CN 105640351 A 6/2016
CN 105662112 A 6/2016
CN 105662125 A 6/2016
CN 105662126 A 6/2016
CN 105662127 A 6/2016
CN 105708312 A 6/2016
CN 205322075 U 6/2016
CN 104605727 B 7/2016
CN 105725730 A 7/2016
CN 105725829 A 7/2016
CN 105768844 A 7/2016
CN 105768859 A 7/2016
CN 105768860 A 7/2016
CN 103908166 B 8/2016
CN 105816023 A 8/2016
CN 105832176 A 8/2016
CN 105852667 A 8/2016
CN 105852668 A 8/2016
CN 105902144 A 8/2016
CN 105902150 A 8/2016
CN 205410811 U 8/2016
CN 205425108 U 8/2016
CN 205433281 U 8/2016
CN 205433317 U 8/2016
CN 205433320 U 8/2016
CN 105919411 A 9/2016
CN 105919417 A 9/2016
CN 105935244 A 9/2016
CN 105935258 A 9/2016
CN 105972653 A 9/2016
CN 205568641 U 9/2016
CN 205568772 U 9/2016
CN 205597052 U 9/2016
CN 105982529 A 10/2016
CN 105982532 A 10/2016
CN 105996737 A 10/2016
CN 105996748 A 10/2016
CN 105996752 A 10/2016
CN 105996753 A 10/2016
CN 106037448 A 10/2016
CN 106037457 A 10/2016
CN 106037458 A 10/2016
CN 106073481 A 11/2016
CN 106073517 A 11/2016
CN 106073519 A 11/2016
CN 106108627 A 11/2016
CN 106108630 A 11/2016
CN 106108631 A 11/2016
CN 106108697 B 11/2016
CN 106166030 A 11/2016
CN 205671926 U 11/2016
CN 205671927 U 11/2016
CN 106175412 A 12/2016
CN 106175476 A 12/2016
CN 106175477 A 12/2016
CN 106213979 A 12/2016
CN 106235878 A 12/2016
CN 106235892 A 12/2016
CN 106235893 A 12/2016
CN 205831665 U 12/2016
CN 106264085 A 1/2017
CN 106264095 A 1/2017
CN 106292340 1/2017
CN 106343895 A 1/2017
CN 205860134 U 1/2017
CN 106377158 A 2/2017
CN 106377159 A 2/2017
CN 106377165 A 2/2017
CN 106388565 A 2/2017
CN 106388572 A 2/2017
CN 106419486 A 2/2017
CN 106419521 A 2/2017
CN 106419524 A 2/2017
CN 106419618 B 2/2017
CN 106419620 A 2/2017
CN 102805554 B 3/2017
CN 106473623 A 3/2017
CN 106490967 A 3/2017
CN 106510449 A 3/2017
CN 206026100 U 3/2017

(56) References Cited

FOREIGN PATENT DOCUMENTS

CN 206044349 U 3/2017
CN 106551617 A 4/2017
CN 106575469 A 4/2017
CN 106580074 A 4/2017
CN 206062888 U 4/2017
CN 206102391 U 4/2017
CN 206119969 U 4/2017
CN 106618154 A 5/2017
CN 106618156 A 5/2017
CN 106667244 A 5/2017
CN 106691171 A 5/2017
CN 206166710 U 5/2017
CN 206166726 U 5/2017
CN 106802584 A 6/2017
CN 106805744 A 6/2017
CN 106805746 A 6/2017
CN 106805747 A 6/2017
CN 106805749 A 6/2017
CN 106805750 A 6/2017
CN 106805752 A 6/2017
CN 106820951 A 6/2017
CN 106820954 A 6/2017
CN 106821017 A 6/2017
CN 106852641 A 6/2017
CN 106859298 A 6/2017
CN 106889875 6/2017
CN 106889876 A 6/2017
CN 106901591 A 6/2017
CN 106901592 A 6/2017
CN 106913201 A 7/2017
CN 106923655 A 7/2017
CN 106943000 A 7/2017
CN 106943002 A 7/2017
CN 106955017 A 7/2017
CN 106974548 A 7/2017
CN 106983360 A 7/2017
CN 106993928 A 8/2017
CN 106998961 A 8/2017
CN 107019418 A 8/2017
CN 107019419 A 8/2017
CN 107019420 A 8/2017
CN 107019423 A 8/2017
CN 107048976 A 8/2017
CN 107048991 A 8/2017
CN 107048993 A 8/2017
CN 107049054 A 8/2017
CN 107049058 A 8/2017
CN 107065634 B 8/2017
CN 107105914 A 8/2017
CN 206371913 U 8/2017
CN 206381064 U 8/2017
CN 104334066 B 9/2017
CN 107136910 A 9/2017
CN 107136911 A 9/2017
CN 107149395 A 9/2017
CN 107149398 A 9/2017
CN 107684357 A 9/2017
CN 105142473 B 10/2017
CN 107224188 A 10/2017
CN 107224197 A 10/2017
CN 107232962 A 10/2017
CN 107259978 A 10/2017
CN 107290094 A 10/2017
CN 107296485 A 10/2017
CN 107296486 A 10/2017
CN 107296487 A 10/2017
CN 107296488 A 10/2017
CN 107296489 A 10/2017
CN 107296490 A 10/2017
CN 107296493 A 10/2017
CN 107296494 A 10/2017
CN 104643954 B 11/2017
CN 107307729 A 11/2017
CN 107307730 A 11/2017
CN 107334388 A 11/2017
CN 107361637 A 11/2017
CN 107397431 A 11/2017
CN 107411540 A 12/2017
CN 107411542 A 12/2017
CN 107432668 A 12/2017
CN 107440490 A 12/2017
CN 107468052 A 12/2017
CN 107495849 A 12/2017
CN 107495856 A 12/2017
CN 107510356 A 12/2017
CN 107510379 A 12/2017
CN 206687606 U 12/2017
CN 206700038 U 12/2017
CN 206777230 U 12/2017
CN 206807803 U 12/2017
CN 206807804 U 12/2017
CN 106213986 B 1/2018
CN 107550250 A 1/2018
CN 107550258 A 1/2018
CN 107595153 A 1/2018
CN 107616686 A 1/2018
CN 206867128 U 1/2018
CN 107647763 A 2/2018
CN 107647769 A 2/2018
CN 107647771 A 2/2018
CN 107647772 A 2/2018
CN 107647773 A 2/2018
CN 107647777 A 2/2018
CN 107660996 A 2/2018
CN 107660997 A 2/2018
CN 107684336 A 2/2018
CN 107684337 A 2/2018
CN 107684338 A 2/2018
CN 107684339 A 2/2018
CN 107684340 A 2/2018
CN 107684341 A 2/2018
CN 107684342 A 2/2018
CN 107692806 A 2/2018
CN 107702838 A 2/2018
CN 107713732 A 2/2018
CN 107713733 A 2/2018
CN 107713734 A 2/2018
CN 107713774 A 2/2018
CN 107726388 A 2/2018
CN 106419522 B 3/2018
CN 107752726 A 3/2018
CN 107752748 A 3/2018
CN 107752751 A 3/2018
CN 107752752 3/2018
CN 107752788 A 3/2018
CN 107773021 A 3/2018
CN 107773026 A 3/2018
CN 107773029 A 3/2018
CN 107773090 A 3/2018
CN 107788820 A 3/2018
CN 107788827 A 3/2018
CN 107811499 A 3/2018
CN 107811517 A 3/2018
CN 107811518 A 3/2018
CN 107822492 A 3/2018
CN 107822494 A 3/2018
CN 107822496 A 3/2018
CN 107822524 A 3/2018
CN 107836981 A 3/2018
CN 107836986 A 3/2018
CN 107836988 A 3/2018
CN 207084680 U 3/2018
CN 207101150 U 3/2018
CN 107874584 A 4/2018
CN 107874599 A 4/2018
CN 107874601 A 4/2018
CN 107874602 A 4/2018
CN 107898351 A 4/2018
CN 107928388 A 4/2018
CN 107928395 A 4/2018
CN 107951369 A 4/2018
CN 107951376 A 4/2018
CN 107951407 A 4/2018
CN 207202762 U 4/2018

(56) References Cited

FOREIGN PATENT DOCUMENTS

CN 207253261 U 4/2018
CN 107969907 A 5/2018
CN 107969908 A 5/2018
CN 107981713 A 5/2018
CN 107997571 A 5/2018
CN 108013742 A 5/2018
CN 108013743 A 5/2018
CN 108030404 A 5/2018
CN 108041976 A 5/2018
CN 108056670 A 5/2018
CN 108078373 A 5/2018
CN 207355971 U 5/2018
CN 108095570 A 6/2018
CN 108113501 A 6/2018
CN 108143256 A 6/2018
CN 108143259 A 6/2018
CN 108143260 A 6/2018
CN 108143261 A 6/2018
CN 108143262 A 6/2018
CN 108143263 A 6/2018
CN 108143264 A 6/2018
CN 108158418 A 6/2018
CN 108158429 A 6/2018
CN 108201338 A 6/2018
CN 108209547 A 6/2018
CN 207429001 U 6/2018
CN 207492655 U 6/2018
CN 207506440 U 6/2018
CN 104207651 B 7/2018
CN 106175423 A 7/2018
CN 108244994 A 7/2018
CN 108244995 A 7/2018
CN 108244997 A 7/2018
CN 108244998 A 7/2018
CN 108244999 A 7/2018
CN 108245000 A 7/2018
CN 108245032 A 7/2018
CN 108261055 A 7/2018
CN 108261056 A 7/2018
CN 108261061 A 7/2018
CN 108272336 A 7/2018
CN 108272338 A 7/2018
CN 108294615 A 7/2018
CN 108294616 A 7/2018
CN 108294640 A 7/2018
CN 108309035 A 7/2018
CN 108324096 A 7/2018
CN 207575048 U 7/2018
CN 207604862 U 7/2018
CN 207627123 U 7/2018
CN 207627136 U 7/2018
CN 207640235 U 7/2018
CN 106388570 B 8/2018
CN 106419517 B 8/2018
CN 108354444 A 8/2018
CN 108354466 A 8/2018
CN 108378678 A 8/2018
CN 108378690 A 8/2018
CN 108402888 A 8/2018
CN 108402889 A 8/2018
CN 108402891 A 8/2018
CN 108402920 A 8/2018
CN 108420304 A 8/2018
CN 108433517 A 8/2018
CN 108433529 A 8/2018
CN 108451351 A 8/2018
CN 108451388 A 8/2018
CN 108464732 A 8/2018
CN 207745052 U 8/2018
CN 207754989 U 8/2018
CN 207755036 U 8/2018
CN 106539491 B 9/2018
CN 107019415 B 9/2018
CN 107019416 B 9/2018
CN 108477987 A 9/2018
CN 108497908 A 9/2018
CN 108497914 A 9/2018
CN 108497918 A 9/2018
CN 108497942 A 9/2018
CN 108523645 A 9/2018
CN 108523647 A 9/2018
CN 108523649 A 9/2018
CN 108542272 A 9/2018
CN 108552969 A 9/2018
CN 108552989 A 9/2018
CN 108567309 A 9/2018
CN 108567321 A 9/2018
CN 108567322 A 9/2018
CN 108577514 A 9/2018
CN 108577580 A 9/2018
CN 207804077 U 9/2018
CN 207804095 U 9/2018
CN 207855533 U 9/2018
CN 207855579 U 9/2018
CN 106264094 B 10/2018
CN 108606627 A 10/2018
CN 108618592 A 10/2018
CN 108618593 A 10/2018
CN 108618594 A 10/2018
CN 108618595 A 10/2018
CN 108618597 A 10/2018
CN 108618651 A 10/2018
CN 108634771 A 10/2018
CN 108634777 A 10/2018
CN 108634807 A 10/2018
CN 108652431 A 10/2018
CN 108652432 A 10/2018
CN 108670021 A 10/2018
CN 108670023 A 10/2018
CN 108670048 A 10/2018
CN 108703644 A 10/2018
CN 108703645 A 10/2018
CN 108703675 A 10/2018
CN 207940738 U 10/2018
CN 207940739 U 10/2018
CN 207940743 U 10/2018
CN 207940754 U 10/2018
CN 106580073 B 11/2018
CN 108720548 A 11/2018
CN 108720577 A 11/2018
CN 108720581 A 11/2018
CN 108720584 A 11/2018
CN 108720585 A 11/2018
CN 108720586 A 11/2018
CN 108720633 A 11/2018
CN 108720650 A 11/2018
CN 108732958 A 11/2018
CN 108771466 A 11/2018
CN 108771488 A 11/2018
CN 108771489 A 11/2018
CN 108784323 A 11/2018
CN 108784324 A 11/2018
CN 108784330 A 11/2018
CN 108784401 A 11/2018
CN 108814274 A 11/2018
CN 108836104 A 11/2018
CN 108836105 A 11/2018
CN 108836107 A 11/2018
CN 108836108 A 11/2018
CN 108836131 A 11/2018
CN 108851966 A 11/2018
CN 108851969 A 11/2018
CN 108888087 A 11/2018
CN 108888099 A 11/2018
CN 108903620 A 11/2018
CN 108903621 A 11/2018
CN 208031026 U 11/2018
CN 208031027 U 11/2018
CN 208031028 U 11/2018
CN 208081098 U 11/2018
CN 208081104 U 11/2018
CN 208081108 U 11/2018
CN 106419520 B 12/2018
CN 106419526 B 12/2018

(56) References Cited

FOREIGN PATENT DOCUMENTS

CN 108926239 A 12/2018
CN 108926249 A 12/2018
CN 108937520 A 12/2018
CN 108937525 A 12/2018
CN 108937556 A 12/2018
CN 108937558 A 12/2018
CN 108937559 A 12/2018
CN 108937560 A 12/2018
CN 108937629 A 12/2018
CN 108955959 A 12/2018
CN 108968659 A 12/2018
CN 108968660 A 12/2018
CN 108968662 A 12/2018
CN 108968663 A 12/2018
CN 108968667 A 12/2018
CN 108968668 A 12/2018
CN 108968669 A 12/2018
CN 108991918 A 12/2018
CN 108991919 A 12/2018
CN 109008595 A 12/2018
CN 109008597 A 12/2018
CN 109008598 A 12/2018
CN 109008663 A 12/2018
CN 109008669 A 12/2018
CN 109077624 A 12/2018
CN 208192913 U 12/2018
CN 208192914 U 12/2018
CN 208192915 U 12/2018
CN 208192916 U 12/2018
CN 208192917 U 12/2018
CN 208192920 U 12/2018
CN 208192921 U 12/2018
CN 208211922 U 12/2018
CN 208228802 U 12/2018
CN 208259529 U 12/2018
CN 106562666 B 1/2019
CN 106606293 B 1/2019
CN 106724784 B 1/2019
CN 106820956 B 1/2019
CN 106820957 B 1/2019
CN 107019417 B 1/2019
CN 109106231 A 1/2019
CN 109247837 A 1/2019
CN 109276159 A 1/2019
CN 208300842 U 1/2019
CN 208319025 U 1/2019
CN 208319027 U 1/2019
CN 208371607 U 1/2019
CN 208435215 U 1/2019
CN 109363520 A 2/2019
CN 208463763 U 2/2019
CN 208510802 U 2/2019
CN 106388566 B 3/2019
CN 107174116 B 3/2019
CN 107174117 B 3/2019
CN 109393956 A 3/2019
CN 109393957 A 3/2019
CN 109393958 A 3/2019
CN 109394005 A 3/2019
CN 109419298 A 3/2019
CN 109419319 A 3/2019
CN 109419327 A 3/2019
CN 109419328 A 3/2019
CN 109419329 A 3/2019
CN 109419330 A 3/2019
CN 109419331 A 3/2019
CN 109419332 A 3/2019
CN 109419333 A 3/2019
CN 109419334 A 3/2019
CN 109419335 A 3/2019
CN 109419336 A 3/2019
CN 109427506 A 3/2019
CN 109431233 A 3/2019
CN 109431254 A 3/2019
CN 109431255 A 3/2019
CN 109431257 A 3/2019
CN 109431258 A 3/2019
CN 109452851 A 3/2019
CN 109452852 A 3/2019
CN 109452854 A 3/2019
CN 109452857 A 3/2019
CN 109452875 A 3/2019
CN 109459181 A 3/2019
CN 109463998 A 3/2019
CN 109463999 A 3/2019
CN 109464000 A 3/2019
CN 109464001 A 3/2019
CN 109480604 A 3/2019
CN 109480605 A 3/2019
CN 109480614 A 3/2019
CN 109497826 A 3/2019
CN 109497827 A 3/2019
CN 109512275 A 3/2019
CN 109512276 A 3/2019
CN 109527982 A 3/2019
CN 109527983 A 3/2019
CN 208551168 U 3/2019
CN 208551408 U 3/2019
CN 208610644 U 3/2019
CN 208610659 U 3/2019
CN 208625445 U 3/2019
CN 109549449 A 4/2019
CN 109549466 A 4/2019
CN 109549468 A 4/2019
CN 109549469 A 4/2019
CN 109549470 A 4/2019
CN 109556147 A 4/2019
CN 109567553 A 4/2019
CN 109567575 A 4/2019
CN 109567576 A 4/2019
CN 109567577 A 4/2019
CN 109567579 A 4/2019
CN 109567582 A 4/2019
CN 109567583 A 4/2019
CN 109567610 A 4/2019
CN 109567612 A 4/2019
CN 109567619 A 4/2019
CN 109588972 A 4/2019
CN 109588973 A 4/2019
CN 109589011 A 4/2019
CN 109602265 A 4/2019
CN 109602274 A 4/2019
CN 109605463 A 4/2019
CN 109619970 A 4/2019
CN 109662607 A 4/2019
CN 109674341 A 4/2019
CN 109674342 A 4/2019
CN 109674357 A 4/2019
CN 109681927 A 4/2019
CN 109691855 A 4/2019
CN 109691858 A 4/2019
CN 109691863 A 4/2019
CN 109691875 A 4/2019
CN 109691878 A 4/2019
CN 109691880 A 4/2019
CN 109691882 A 4/2019
CN 109691905 A 4/2019
CN 109694242 A 4/2019
CN 109696196 A 4/2019
CN 208709591 U 4/2019
CN 208740748 U 4/2019
CN 208755746 U 4/2019
CN 208755752 U 4/2019
CN 208755753 U 4/2019
CN 208755759 U 4/2019
CN 208784365 U 4/2019
CN 109744849 A 5/2019
CN 109793430 A 5/2019
CN 109820432 A 5/2019
CN 208808155 U 5/2019
CN 208837695 U 5/2019
CN 208851291 U 5/2019
CN 208864113 U 5/2019
CN 208909747 U 5/2019

(56) References Cited

FOREIGN PATENT DOCUMENTS

| | | |
|---|---|---|
| CN | 208909882 U | 5/2019 |
| CN | 208909883 U | 5/2019 |
| CN | 105640308 A | 6/2019 |
| CN | 105996805 B | 6/2019 |
| CN | 109870938 A | 6/2019 |
| CN | 109875418 A | 6/2019 |
| CN | 109892967 A | 6/2019 |
| CN | 208941868 U | 6/2019 |
| CN | 208973499 U | 6/2019 |
| CN | 208973501 U | 6/2019 |
| CN | 208973502 U | 6/2019 |
| CN | 208973503 U | 6/2019 |
| CN | 208973504 U | 6/2019 |
| CN | 208973507 U | 6/2019 |
| CN | 208988575 U | 6/2019 |
| CN | 209003634 U | 6/2019 |
| CN | 109953636 A | 7/2019 |
| CN | 109953642 A | 7/2019 |
| CN | 109965667 A | 7/2019 |
| CN | 109965672 A | 7/2019 |
| CN | 109965682 A | 7/2019 |
| CN | 109965683 A | 7/2019 |
| CN | 109965684 A | 7/2019 |
| CN | 109965688 A | 7/2019 |
| CN | 109965689 A | 7/2019 |
| CN | 109965691 A | 7/2019 |
| CN | 109965692 A | 7/2019 |
| CN | 109965710 A | 7/2019 |
| CN | 109984561 A | 7/2019 |
| CN | 109984563 A | 7/2019 |
| CN | 109984574 A | 7/2019 |
| CN | 109984576 A | 7/2019 |
| CN | 109984577 A | 7/2019 |
| CN | 109984578 A | 7/2019 |
| CN | 109984580 A | 7/2019 |
| CN | 109984581 A | 7/2019 |
| CN | 109984582 A | 7/2019 |
| CN | 109984583 A | 7/2019 |
| CN | 109984585 A | 7/2019 |
| CN | 109984586 A | 7/2019 |
| CN | 109984587 A | 7/2019 |
| CN | 109984588 A | 7/2019 |
| CN | 109984589 A | 7/2019 |
| CN | 109984590 A | 7/2019 |
| CN | 109984591 A | 7/2019 |
| CN | 109984592 A | 7/2019 |
| CN | 109984594 A | 7/2019 |
| CN | 109984595 A | 7/2019 |
| CN | 109984623 A | 7/2019 |
| CN | 109986453 A | 7/2019 |
| CN | 109996475 A | 7/2019 |
| CN | 109998370 A | 7/2019 |
| CN | 109998371 A | 7/2019 |
| CN | 109998385 A | 7/2019 |
| CN | 110013163 A | 7/2019 |
| CN | 110013181 A | 7/2019 |
| CN | 110025214 A | 7/2019 |
| CN | 110025215 A | 7/2019 |
| CN | 110037535 A | 7/2019 |
| CN | 110056916 A | 7/2019 |
| CN | 110063650 A | 7/2019 |
| CN | 110063671 A | 7/2019 |
| CN | 209058897 U | 7/2019 |
| CN | 209090836 U | 7/2019 |
| CN | 209090929 U | 7/2019 |
| CN | 209090938 U | 7/2019 |
| CN | 209090939 U | 7/2019 |
| CN | 209090943 U | 7/2019 |
| CN | 209090950 U | 7/2019 |
| CN | 209090955 U | 7/2019 |
| CN | 209090956 U | 7/2019 |
| CN | 209090957 U | 7/2019 |
| CN | 209136189 U | 7/2019 |
| CN | 209136190 U | 7/2019 |
| CN | 110074647 A | 8/2019 |
| CN | 110074685 A | 8/2019 |
| CN | 110074690 A | 8/2019 |
| CN | 110089931 A | 8/2019 |
| CN | 110089932 A | 8/2019 |
| CN | 110101301 A | 8/2019 |
| CN | 110101303 A | 8/2019 |
| CN | 110101304 A | 8/2019 |
| CN | 110101319 A | 8/2019 |
| CN | 110115500 A | 8/2019 |
| CN | 110123118 A | 8/2019 |
| CN | 110123132 A | 8/2019 |
| CN | 110123133 A | 8/2019 |
| CN | 110123134 A | 8/2019 |
| CN | 110123137 A | 8/2019 |
| CN | 110141104 A | 8/2019 |
| CN | 110141110 A | 8/2019 |
| CN | 110141111 A | 8/2019 |
| CN | 110141112 A | 8/2019 |
| CN | 110150957 A | 8/2019 |
| CN | 209202775 U | 8/2019 |
| CN | 209220022 U | 8/2019 |
| CN | 209252407 U | 8/2019 |
| CN | 209269447 U | 8/2019 |
| CN | 209285276 U | 8/2019 |
| CN | 209300780 U | 8/2019 |
| CN | 209315656 U | 8/2019 |
| CN | 209315657 U | 8/2019 |
| CN | 110192764 A | 9/2019 |
| CN | 110192765 A | 9/2019 |
| CN | 110192766 A | 9/2019 |
| CN | 110192767 A | 9/2019 |
| CN | 110192768 A | 9/2019 |
| CN | 110200471 A | 9/2019 |
| CN | 110200472 A | 9/2019 |
| CN | 110200493 A | 9/2019 |
| CN | 110200494 A | 9/2019 |
| CN | 110200495 A | 9/2019 |
| CN | 110213984 A | 9/2019 |
| CN | 110236363 A | 9/2019 |
| CN | 110236364 A | 9/2019 |
| CN | 110236379 A | 9/2019 |
| CN | 110250904 A | 9/2019 |
| CN | 110250905 A | 9/2019 |
| CN | 110250920 A | 9/2019 |
| CN | 110269506 A | 9/2019 |
| CN | 110269507 A | 9/2019 |
| CN | 110269508 A | 9/2019 |
| CN | 110279291 A | 9/2019 |
| CN | 110279292 A | 9/2019 |
| CN | 110279308 A | 9/2019 |
| CN | 110279317 A | 9/2019 |
| CN | 209360444 U | 9/2019 |
| CN | 209360464 U | 9/2019 |
| CN | 209436923 U | 9/2019 |
| CN | 209436924 U | 9/2019 |
| CN | 209436925 U | 9/2019 |
| CN | 209436942 U | 9/2019 |
| CN | 209437002 U | 9/2019 |
| CN | 110292303 A | 10/2019 |
| CN | 110292304 A | 10/2019 |
| CN | 110301814 A | 10/2019 |
| CN | 110301815 A | 10/2019 |
| CN | 110313805 A | 10/2019 |
| CN | 110313810 A | 10/2019 |
| CN | 110313811 A | 10/2019 |
| CN | 110313812 A | 10/2019 |
| CN | 110313813 A | 10/2019 |
| CN | 110313814 A | 10/2019 |
| CN | 110313816 A | 10/2019 |
| CN | 110313817 A | 10/2019 |
| CN | 110313818 A | 10/2019 |
| CN | 110313819 A | 10/2019 |
| CN | 110326958 A | 10/2019 |
| CN | 110338639 A | 10/2019 |
| CN | 110338647 A | 10/2019 |
| CN | 110353467 A | 10/2019 |
| CN | 110353469 A | 10/2019 |
| CN | 110353497 A | 10/2019 |
| CN | 110367838 A | 10/2019 |

(56) References Cited

FOREIGN PATENT DOCUMENTS

CN 110384387 A 10/2019
CN 110384389 A 10/2019
CN 209450331 U 10/2019
CN 209518760 U 10/2019
CN 209518767 U 10/2019
CN 209528876 U 10/2019
CN 209547775 U 10/2019
CN 110393437 A 11/2019
CN 110403454 A 11/2019
CN 110403455 A 11/2019
CN 110403457 A 11/2019
CN 110403458 A 11/2019
CN 110419942 A 11/2019
CN 110419943 A 11/2019
CN 110430793 A 11/2019
CN 110432763 A 11/2019
CN 110432764 A 11/2019
CN 110432765 A 11/2019
CN 110448164 A 11/2019
CN 110448165 A 11/2019
CN 110448189 A 11/2019
CN 110464199 A 11/2019
CN 110464200 A 11/2019
CN 110464212 A 11/2019
CN 110475493 A 11/2019
CN 110477742 A 11/2019
CN 110477743 A 11/2019
CN 110477762 A 11/2019
CN 110477764 A 11/2019
CN 110495774 A 11/2019
CN 110507152 A 11/2019
CN 110507166 A 11/2019
CN 110507168 A 11/2019
CN 110507170 A 11/2019
CN 110507171 A 11/2019
CN 110507176 A 11/2019
CN 110507181 A 11/2019
CN 110507198 A 11/2019
CN 110507199 A 11/2019
CN 110520022 A 11/2019
CN 209564018 U 11/2019
CN 209610822 U 11/2019
CN 209610824 U 11/2019
CN 209610827 U 11/2019
CN 209629508 U 11/2019
CN 209644658 U 11/2019
CN 110522315 A 12/2019
CN 110537836 A 12/2019
CN 110537849 A 12/2019
CN 110547657 A 12/2019
CN 110547674 A 12/2019
CN 110547675 A 12/2019
CN 110547694 A 12/2019
CN 110558827 A 12/2019
CN 110558832 A 12/2019
CN 110558858 A 12/2019
CN 110558861 A 12/2019
CN 110575049 A 12/2019
CN 110575062 A 12/2019
CN 110575077 A 12/2019
CN 110575083 A 12/2019
CN 110584329 A 12/2019
CN 110584470 A 12/2019
CN 110584472 A 12/2019
CN 110604465 A 12/2019
CN 110604469 A 12/2019
CN 110613306 A 12/2019
CN 110613311 A 12/2019
CN 110613323 A 12/2019
CN 110613324 A 12/2019
CN 110613326 A 12/2019
CN 110613327 A 12/2019
CN 110613329 A 12/2019
CN 110613331 A 12/2019
CN 110613365 A 12/2019
CN 110613366 A 12/2019
CN 110623519 A 12/2019
CN 110623533 A 12/2019
CN 110623534 A 12/2019
CN 110623535 A 12/2019
CN 110623551 A 12/2019
CN 110623572 A 12/2019
CN 209733609 U 12/2019
CN 209750794 U 12/2019
CN 209770158 U 12/2019
CN 209826266 U 12/2019
CN 209826275 U 12/2019
CN 209863297 U 12/2019
CN 209863352 U 12/2019
CN 209863353 U 12/2019
CN 209863354 U 12/2019
CN 209863355 U 12/2019
CN 209863450 U 12/2019
CN 110638322 A 1/2020
CN 110652172 A 1/2020
CN 110652188 A 1/2020
CN 110652191 A 1/2020
CN 110652192 A 1/2020
CN 110652193 A 1/2020
CN 110652196 A 1/2020
CN 110652197 A 1/2020
CN 110652211 A 1/2020
CN 110652217 A 1/2020
CN 110663725 A 1/2020
CN 110664235 A 1/2020
CN 110664236 A 1/2020
CN 110664237 A 1/2020
CN 110664239 A 1/2020
CN 110680203 A 1/2020
CN 110680206 A 1/2020
CN 110693316 A 1/2020
CN 110710864 A 1/2020
CN 110710892 A 1/2020
CN 110720826 A 1/2020
CN 209995969 U 1/2020
CN 107773030 B 2/2020
CN 110742492 A 2/2020
CN 110742500 A 2/2020
CN 110754924 A 2/2020
CN 110754925 A 2/2020
CN 110754926 A 2/2020
CN 110754927 A 2/2020
CN 110754929 A 2/2020
CN 110754930 A 2/2020
CN 110754931 A 2/2020
CN 110754932 A 2/2020
CN 110754933 A 2/2020
CN 110772114 A 2/2020
CN 110772115 A 2/2020
CN 110772125 A 2/2020
CN 110786730 A 2/2020
CN 110786731 A 2/2020
CN 110786732 A 2/2020
CN 110786733 A 2/2020
CN 110786749 A 2/2020
CN 110801144 A 2/2020
CN 110801145 A 2/2020
CN 110801148 A 2/2020
CN 110801149 A 2/2020
CN 110801150 A 2/2020
CN 110811282 A 2/2020
CN 110811294 A 2/2020
CN 110811295 A 2/2020
CN 110811313 A 2/2020
CN 110811315 A 2/2020
CN 110811316 A 2/2020
CN 110811318 A 2/2020
CN 110811343 A 2/2020
CN 110833316 A 2/2020
CN 110840216 A 2/2020
CN 110840237 A 2/2020
CN 110840238 A 2/2020
CN 110840239 A 2/2020
CN 110840240 A 2/2020

(56) References Cited

FOREIGN PATENT DOCUMENTS

CN 110840241 A 2/2020
CN 110840242 A 2/2020
CN 110840243 A 2/2020
CN 110840245 A 2/2020
CN 110840269 A 2/2020
CN 110868894 A 3/2020
CN 110876559 A 3/2020
CN 110876567 A 3/2020
CN 210124638 U 3/2020
CN 210169803 U 3/2020
CN 210185391 U 3/2020
CN 110960112 A 4/2020
CN 111000430 A 4/2020
CN 111012203 A 4/2020
CN 111053458 A 4/2020
CN 210227842 U 4/2020
CN 210227855 U 4/2020
CN 210276928 U 4/2020
CN 210300635 U 4/2020
CN 210300732 U 4/2020
CN 210300733 U 4/2020
CN 210383667 U 4/2020
CN 210408053 U 4/2020
CN 210408158 U 4/2020
CN 111184453 A 5/2020
CN 210433346 U 5/2020
CN 210493785 U 5/2020
CN 210493795 U 5/2020
CN 210540823 U 5/2020
CN 210540971 U 5/2020
CN 210540972 U 5/2020
CN 210540973 U 5/2020
CN 210540974 U 5/2020
CN 210540981 U 5/2020
CN 210582243 U 5/2020
CN 111214101 A 6/2020
CN 111214102 A 6/2020
CN 111214131 A 6/2020
CN 111227668 A 6/2020
CN 111227671 A 6/2020
CN 111248768 A 6/2020
CN 111248771 A 6/2020
CN 111297215 A 6/2020
CN 111317357 A 6/2020
CN 210673100 U 6/2020
CN 210697273 U 6/2020
CN 210697274 U 6/2020
CN 210727514 U 6/2020
CN 210810486 U 6/2020
CN 210810617 U 6/2020
CN 210871141 U 6/2020
CN 111358308 A 7/2020
CN 111374527 A 7/2020
CN 111381503 A 7/2020
CN 111387837 A 7/2020
CN 111387840 A 7/2020
CN 111449536 A 7/2020
CN 210961428 U 7/2020
CN 210961465 U 7/2020
CN 210961472 U 7/2020
CN 210961552 U 7/2020
CN 210961553 U 7/2020
CN 210989805 U 7/2020
CN 111543865 A 8/2020
CN 211186926 U 8/2020
CN 211212725 U 8/2020
CN 211212750 U 8/2020
CN 211242957 U 8/2020
CN 211242962 U 8/2020
CN 211269978 U 8/2020
CN 211270194 U 8/2020
CN 211324483 U 8/2020
CN 211432279 U 9/2020
CN 211432426 U 9/2020
CN 211432435 U 9/2020
CN 211559722 U 9/2020
CN 211559785 U 9/2020
CN 211582730 U 9/2020
CN 111772499 A 10/2020
CN 211609338 U 10/2020
CN 211609340 U 10/2020
CN 211609354 U 10/2020
DE 2705168 A1 8/1978
DE 2753827 A1 6/1979
DE 202011002302 U1 * 7/2011 ............ A47J 37/101
DE 102011002821 A1 7/2012
DE 202017102536 U1 8/2018
EP 1767860 A1 3/2007
EP 2003400 A2 12/2008
EP 2020574 A2 2/2009
EP 2910856 A1 8/2015
EP 2976977 A1 1/2016
EP 3165134 A1 5/2017
EP 2904953 B1 12/2018
EP 3491980 A1 6/2019
FR 2409736 A1 6/1979
GB 2398628 A 8/2004
GB 2479384 A 10/2011
JP S5827524 A 2/1983
JP H09164074 A 6/1997
JP 10028643 A 2/1998
JP 2005147604 A 6/2005
JP 2007007027 A 1/2007
JP 2008018122 A 1/2008
JP 2009291417 12/2009
JP 2011010786 A 1/2011
JP 2013106850 A 6/2013
JP 2014200627 A 10/2014
JP 2014204770 A 10/2014
JP 2015145778 A 8/2015
KR 102109966 B1 5/2020
WO 8911773 A1 11/1989
WO 9837796 A1 9/1998
WO 9930086 6/1999
WO 9952328 A1 10/1999
WO 0044096 7/2000
WO 0049839 A1 8/2000
WO 2006122643 A1 11/2006
WO 2006132612 A1 12/2006
WO 2009043812 A1 4/2009
WO 2012051508 A2 4/2012
WO 2015006891 A1 1/2015
WO 2015028940 A1 3/2015
WO WO-2015062197 A1 * 5/2015 ............ A47J 27/004
WO 2015081549 A1 6/2015
WO 2016007002 A1 1/2016
WO 2016012908 A1 1/2016
WO 2016028549 A1 2/2016
WO 2016091063 A1 6/2016
WO 2016141009 A1 9/2016
WO 2016148492 A1 9/2016
WO 2016154114 A1 9/2016
WO 2016165198 A1 10/2016
WO 2016171385 A1 10/2016
WO 2016182975 A1 11/2016
WO 2016189440 12/2016
WO 2016193008 A1 12/2016
WO 2016193643 A1 12/2016
WO 2016199086 A1 12/2016
WO 2017005533 A1 1/2017
WO 2017039091 A1 3/2017
WO 2017045387 A1 3/2017
WO 2017049635 A1 3/2017
WO 2017049717 A1 3/2017
WO 2017050693 A2 3/2017
WO 2017063872 A1 4/2017
WO 2017072068 A1 5/2017
WO 2017074119 A1 5/2017
WO 2017076797 A1 5/2017
WO 2017081420 A1 5/2017
WO 2017085026 A1 5/2017
WO 2017085671 A1 5/2017
WO 2017085673 A1 5/2017
WO 2017086543 A1 5/2017

(56) References Cited

FOREIGN PATENT DOCUMENTS

WO 2017092062 A1 6/2017
WO 2017092063 A1 6/2017
WO 2017094968 A1 6/2017
WO 2017097790 A1 6/2017
WO 2017104892 A1 6/2017
WO 2017104894 A1 6/2017
WO 2017104895 A1 6/2017
WO 2017104896 A1 6/2017
WO 2017104898 A1 6/2017
WO 2017104900 A1 6/2017
WO 2017105076 A2 6/2017
WO 2017111425 A1 6/2017
WO 2017121691 A1 7/2017
WO 2017127655 A1 7/2017
WO 2017144795 A1 8/2017
WO 2017149519 A1 9/2017
WO 2017152518 A1 9/2017
WO 2017153360 A1 9/2017
WO 2017158068 A1 9/2017
WO 2017166317 A1 10/2017
WO 2017177007 A1 10/2017
WO 2017177423 A1 10/2017
WO 2017178229 A1 10/2017
WO 2017178650 A1 10/2017
WO 2017178739 A1 10/2017
WO 2017179804 A1 10/2017
WO 2017191377 A1 11/2017
WO 2017191395 A1 11/2017
WO 2017195777 A1 11/2017
WO 2017197482 A1 11/2017
WO 2017198815 A1 11/2017
WO 2017198848 A1 11/2017
WO 2017201530 A1 11/2017
WO 2017202641 A1 11/2017
WO 2017209465 A1 12/2017
WO 2017211045 A1 12/2017
WO 2017213330 A2 12/2017
WO 2017213423 A1 12/2017
WO 2017215926 A1 12/2017
WO 2017215988 A1 12/2017
WO 2018004226 A1 1/2018
WO 2018007218 A1 1/2018
WO 2018014806 A1 1/2018
WO 2018015695 A1 1/2018
WO 2017077571 A1 2/2018
WO 2018018670 A1 2/2018
WO 2018023863 A1 2/2018
WO 2018024781 A1 2/2018
WO 2018024782 A1 2/2018
WO 2018024783 A1 2/2018
WO 2018026041 A1 2/2018
WO 2018026906 A1 2/2018
WO 2018026928 A1 2/2018
WO 2018032540 A1 2/2018
WO 2018032541 A1 2/2018
WO 2018032542 A1 2/2018
WO 2018032589 A1 2/2018
WO 2018032648 A1 2/2018
WO 2018037177 A1 3/2018
WO 2018040250 A1 3/2018
WO 2018041536 A1 3/2018
WO 2018045643 A1 3/2018
WO 2018050520 A1 3/2018
WO 2018050838 A1 3/2018
WO 2018058384 A1 4/2018
WO 2018058569 A1 4/2018
WO 2018058740 A1 4/2018
WO 2018059994 A1 4/2018
WO 2018060260 A1 4/2018
WO 2018060273 A1 4/2018
WO 2018060331 A1 4/2018
WO 2018065424 A1 4/2018
WO 2018068376 A1 4/2018
WO 2018068425 A1 4/2018
WO 2018068976 A1 4/2018
WO 2018076164 A1 5/2018
WO 2018076166 A1 5/2018
WO 2018076415 A1 5/2018
WO 2018082131 A1 5/2018
WO 2018090287 A1 5/2018
WO 2018093004 A1 5/2018
WO 2018095247 A1 5/2018
WO 2018095420 A1 5/2018
WO 2018095949 A1 5/2018
WO 2018120561 A1 5/2018
WO 2017104893 A1 6/2018
WO 2018099233 A1 6/2018
WO 2018102128 A1 6/2018
WO 2018104351 A1 6/2018
WO 2018107522 A1 6/2018
WO 2018107973 A1 6/2018
WO 2018116056 A1 6/2018
WO 2018116057 A1 6/2018
WO 2018121166 A1 7/2018
WO 2018121199 A1 7/2018
WO 2018133993 A1 7/2018
WO 2018137832 A1 8/2018
WO 2018138078 A1 8/2018
WO 2018140954 A1 8/2018
WO 2018142088 A1 8/2018
WO 2018146872 A1 8/2018
WO 2018147640 A1 8/2018
WO 2018157409 A1 9/2018
WO 2018161497 A1 9/2018
WO 2018165698 A1 9/2018
WO 2018171250 A1 9/2018
WO 2018189921 A1 10/2018
WO 2018191960 A1 10/2018
WO 2018197720 A1 11/2018
WO 2018207221 A1 11/2018
WO 2018212473 A1 11/2018
WO 2018216042 A1 11/2018
WO 2018220659 A1 12/2018
WO 2018223713 A1 12/2018
WO 2018227851 A1 12/2018
WO 2018227852 A1 12/2018
WO 2018227866 A1 12/2018
WO 2018227938 A1 12/2018
WO 2018233210 A1 12/2018
WO 2018235095 A1 12/2018
WO 2019015425 A1 1/2019
WO 2019026018 A1 2/2019
WO 2019032876 A1 2/2019
WO 2019032878 A1 2/2019
WO 2019061758 A1 4/2019
WO 2019064319 A1 4/2019
WO 2019066747 A1 4/2019
WO 2019071975 A1 4/2019
WO 2019080672 A1 5/2019
WO 2019081824 A1 5/2019
WO 2019081825 A1 5/2019
WO 2019082210 A1 5/2019
WO 2019085602 A1 5/2019
WO 2019086393 A1 5/2019
WO 2019091169 A1 5/2019
WO 2019097545 A1 5/2019
WO 2019104818 A1 6/2019
WO 2019110340 A1 6/2019
WO 2019111179 A1 6/2019
WO 2019114890 A1 6/2019
WO 2019128111 A1 7/2019
WO 2019129598 A1 7/2019
WO 2019130011 A1 7/2019
WO 2019132150 A1 7/2019
WO 2019136785 A1 7/2019
WO 2019141207 A1 7/2019
WO 2019141321 A1 7/2019
WO 2019149573 A1 8/2019
WO 2019153512 A1 8/2019
WO 2019153807 A1 8/2019
WO 2019183755 A1 10/2019
WO 2019184188 A1 10/2019
WO 2019185321 A1 10/2019
WO 2019201084 A1 10/2019

(56) References Cited

FOREIGN PATENT DOCUMENTS

| | | | |
|---|---|---|---|
| WO | 2019207325 | A1 | 10/2019 |
| WO | 2019219018 | A1 | 11/2019 |
| WO | 2019227766 | A1 | 12/2019 |
| WO | 2019227843 | A1 | 12/2019 |
| WO | 2019229763 | A1 | 12/2019 |
| WO | 2019233018 | A1 | 12/2019 |
| WO | 2019237478 | A1 | 12/2019 |
| WO | 2019237483 | A1 | 12/2019 |
| WO | 2019237631 | A1 | 12/2019 |
| WO | 2019238605 | A1 | 12/2019 |
| WO | 2019238794 | A1 | 12/2019 |
| WO | 2019243093 | A1 | 12/2019 |
| WO | 2019243922 | A1 | 12/2019 |
| WO | 2020000046 | A1 | 1/2020 |
| WO | 2020002064 | A1 | 1/2020 |
| WO | 2020010513 | A1 | 1/2020 |
| WO | 2020016084 | A1 | 1/2020 |
| WO | 2020016085 | A1 | 1/2020 |
| WO | 2020029519 | A1 | 2/2020 |
| WO | 2020029520 | A1 | 2/2020 |
| WO | 2020029695 | A1 | 2/2020 |
| WO | 2020030462 | A1 | 2/2020 |
| WO | 2020034764 | A1 | 2/2020 |
| WO | 2020034798 | A1 | 2/2020 |
| WO | 2020037914 | A1 | 2/2020 |
| WO | 2020038209 | A1 | 2/2020 |
| WO | 2020042466 | A1 | 3/2020 |
| WO | 2020052010 | A1 | 3/2020 |
| WO | 2020062650 | A1 | 4/2020 |
| WO | 2020062651 | A1 | 4/2020 |
| WO | 2020070198 | A1 | 4/2020 |
| WO | 2020071590 | A1 | 4/2020 |
| WO | 2020073522 | A1 | 4/2020 |
| WO | 2020074178 | A1 | 4/2020 |
| WO | 2020074476 | A1 | 4/2020 |
| WO | 2020078010 | A1 | 4/2020 |
| WO | 2020078403 | A1 | 4/2020 |
| WO | 2020078836 | A1 | 4/2020 |
| WO | 2020080738 | A1 | 4/2020 |
| WO | 2020082329 | A1 | 4/2020 |
| WO | 2020082854 | A1 | 4/2020 |
| WO | 2020087714 | A1 | 5/2020 |
| WO | 2020091531 | A1 | 5/2020 |
| WO | 2020093417 | A1 | 5/2020 |
| WO | 2020094293 | A1 | 5/2020 |
| WO | 2020098748 | A1 | 5/2020 |
| WO | 2020098749 | A1 | 5/2020 |
| WO | 2020099339 | A1 | 5/2020 |
| WO | 2020099355 | A1 | 5/2020 |
| WO | 2020108375 | A1 | 6/2020 |
| WO | 2020108917 | A1 | 6/2020 |
| WO | 2020127334 | A1 | 6/2020 |
| WO | 2020134318 | A1 | 7/2020 |
| WO | 2020148164 | A1 | 7/2020 |
| WO | 2020148187 | A1 | 7/2020 |
| WO | 2020163711 | A1 | 8/2020 |
| WO | 2020177323 | A1 | 9/2020 |
| WO | 2020184785 | A1 | 9/2020 |

OTHER PUBLICATIONS

Chinese Application No. 2019105566386 filed Jun. 25, 2019; Office Action with English Translation dated Sep. 9, 2020; 11 pages.

Chinese Application No. 201910557433.X filed Jun. 25, 2019; First Office Action with English Translation; 12 pages.

Chinese Application No. 2019105629830 filed Jun. 26, 2019; Office Action with English Translation dated Jun. 29, 2020; 18 pages.

Chinese Application No. 201910563072 filed Aug. 9, 2018; Office Action with English translation dated Mar. 9, 2020; 14 pages.

Chinese Patent Application No. 2019105638416 filed Jun. 26, 2019; Office Action with English Translation dated Nov. 3, 2020; 16 pages.

European Application No. 1921797806-1004 filed Dec. 31, 2019; European Search Report dated Apr. 1, 2020; 7 pages.

European Application No. 19218088.3-1004 filed Dec. 19, 2019; European Search Report dated Jun. 3, 2020; 7 pages.

European Application No. 19218129.5-1004 filed Dec. 19, 2019; European Search Report dated May 19, 2020; 7 pages.

European Application No. 19218218.6-1004 filed Dec. 19, 2019; European Search Report dated May 27, 2020; 6 pages.

European Application No. 19218240.0-1004 filed Dec. 19, 2019; European Search Report dated May 27, 2020; 7 pages.

European Application No. 19218251.7-1004 filed Dec. 19, 2019; European Search Report dated May 27, 2020; 7 pages.

European Application No. 19218259.0-1004 filed Dec. 19, 2019; European Search Report dated May 27, 2020; 7 pages.

International Search Report for International Application No. PCT/US2019/065662 filed Dec. 11, 2019; dated Mar. 25, 2020; 7 pages.

International Search Report for International Application No. PCT/US2020/017203; International Filing Date: Feb. 7, 2020; dated Jun. 4, 2020; 6 pages.

International Search Report for International Application No. PCT/US2020/017205; International Filing Date: Feb. 7, 2020; dated Jul. 16, 2020; 8 pages.

International Search Report for International Application No. PCT/US2020/019685; International Filing Date: Feb. 25, 2020; dated Dec. 8, 2020; 8 pages.

International Search Report for International Application No. PCT/US2020/19664; International Filing Date: Feb. 25, 2020; dated Jun. 4, 2020; 6 pages.

Invitation to Pay Additional Fees for International Application No. PCT/US2020/017205; International Filing Date: Feb. 7, 2020; dated May 19, 2020; 61 pages.

Invitation to Pay Additional Fees for International Application No. PCT/US2020/019685; International Filing Date: Feb. 25, 2020; dated Oct. 13, 2020; 11 pages.

Japanese Application No. 2020-030582 filed Feb. 26, 2020; Japanese Office Action with English Translation dated Dec. 8, 2020; 8 pages.

Japanese Application No. 2020-030585 filed Feb. 26, 2020; Japanese Office Action with English dated Dec. 8, 2020; 7 pages.

Japanese Application No. 2020-030586 filed Feb. 26, 2020; Japanese Office Action with English Translation dated Dec. 8, 2020; 6 pages.

Japanese Application No. 2020-030587 filed Feb. 26, 2020; Japanese Office Action with English Translation dated Dec. 8, 2020; 4 pages.

Japanese Patent Application No. 2020-030583 filed Feb. 26, 2020; Office Action with English Translation dated Nov. 10, 2020; 13 pages.

Japanese Patent Application No. 2020-030584 filed Feb. 26, 2020; Office Action with English Translation; 6 pages.

U.S. Appl. No. 16/671,709, filed Nov. 1, 2019; Non-Final Office Action dated Jul. 8, 2020; 28 pages.

U.S. Appl. No. 17/084,891, filed Oct. 30, 2020; Third Party Submission Under 37 CFR 1.290 dated Dec. 8, 2020; 72 pages.

U.S. Appl. No. 16/357,270, filed Mar. 18, 2019; Non-Final Office Action dated Dec. 21, 2020; 32 pages.

U.S. Appl. No. 16/402,023, filed May 2, 2019; Final Office Action dated Nov. 17, 2020; 26 pages.

U.S. Appl. No. 16/402,029, filed May 2, 2019; Final Office Action dated Mar. 5, 2020; 10 pages.

U.S. Appl. No. 16/402,029, filed May 2, 2019; Non-Final Office Action dated Aug. 24, 2020; 27 pages.

U.S. Appl. No. 16/548,562, filed Aug. 22, 2019; Non-Final Office Action dated Aug. 3, 2020; 35 pages.

U.S. Appl. No. 16/559,174, filed Sep. 3, 2019; Non-Final Office Action dated Aug. 28, 2020; 58 pages.

U.S. Appl. No. 16/671,709, filed Nov. 1, 2019; Third Party Submission Under 37 CFR 1.290 dated Feb. 26, 2020; pp. 1-79.

U.S. Appl. No. 16/671,709, filed Nov. 1, 2019; Final Office Action dated Jan. 1, 2021; 29 pages.

U.S. Appl. No. 16/671,972, filed Nov. 1, 2019; Third Party Submission Under 37 CFR 1.290 dated Feb. 27, 2020; pp. 1-81.

U.S. Appl. No. 16/671,972, filed Nov. 1, 2019; Non-Final Office Action dated Jul. 31, 2020; 30 pages.

(56) References Cited

OTHER PUBLICATIONS

U.S. Appl. No. 16/678,628, filed Nov. 8, 2019; Non-Final Office Action dated Nov. 2, 2020; 53 pages.
U.S. Appl. No. 16/678,628, filed Nov. 8, 2019; Notice of Allowance dated Sep. 21, 2020; 9 pages.
U.S. Appl. No. 16/800,089, filed Feb. 25, 2020; Third Party Submission Under 37 CFR 1.290 dated Mar. 13, 2020; pp. 1-82.
U.S. Appl. No. filed Mar. 18, 2019; Final Office Action dated Aug. 24, 2020; 33 pages.
U.S. Appl. No. 16/357,250, filed Mar. 18, 2019; Non-Final Office Action dated Apr. 17, 2020; 1-12 pages.
U.S. Appl. No. 16/548,562, filed Aug. 22, 2019; Final Office Action dated Mar. 9, 2020; 26 pages.
U.S. Appl. No. 16/559,174, filed Sep. 3, 2019; Final Office Action dated Mar. 12, 2020; 1-35 pages.
Written Opinion for International Application No. PCT/US2019/065662 filed Dec. 11, 2019; dated Mar. 25, 2020; 7 pages.
Written Opinion for International Application No. PCT/US2020/017203; International Filing Date: Feb. 7, 2020; dated Jun. 4, 2020; 10 pages.
Written Opinion for International Application No. PCT/US2020/017205; International Filing Date: Feb. 7, 2020; dated Jul. 16, 2020; 11 pages.
Written Opinion for International Application No. PCT/US2020/019685; International Filing Date: Feb. 25, 2020; dated Dec. 8, 2020; 12 pages.
Written Opinion for International Application No. PCT/US2020/19664; International Filing Date: Feb. 25, 2020; dated Jun. 4, 2020; 10 pages.
Anthony et al.; Cooking Device and Components Thereof; U.S. Appl. No. 16/402,023, filed May 2, 2019.
Anthony et al.; Cooking Device and Components Thereof; U.S. Appl. No. 16/402,029, filed May 2, 2019.
Anthony et al.; Cooking Device and Components Thereof; U.S. Appl. No. 16/402,035, filed May 2, 2019.
WO2018122652A1; Jul. 5, 2018; English Abstract Only (3 Pages).
Deng et al.; Design U.S. Appl. No. 29/659,577, filed Aug. 9, 2018; Food Preparation Device, User Interface, and Parts Thereof.
Gill et al.; U.S. Appl. No. 16/059,874, filed Aug. 9, 2018; Cooking Device and Components Thereof.
Gill et al.; U.S. Appl. No. 16/059,876, filed Aug. 9, 2018; Cooking Device and Components Thereof.
Gill et al.; Design U.S. Appl. No. 29/653,847, filed Jun. 19, 2018; Air Diffuser and Air Diffuser With Food Preparation Pot.
Gill et al.; Design U.S. Appl. No. 29/659,576, filed Aug. 9, 2018; Cooking Basket.
Gill et al.; Design U.S. Appl. No. 29/659,578, filed Aug. 9, 2018; Reversible Cooking Rack.
Notification of Transmittal of the International Search Report of the International Searching Authority, or the Declaration. PCT/US2018/046077, dated Dec. 19, 2018, 7 pages.
Notification of Transmittal of the International Search Report of the International Searching Authority, or the Declaration; PCT/US2018/046079; dated Jan. 2, 2019, 7 pages.
Notification of Transmittal of the Written Opinion of the International Searching Authority, or the Declaration. PCT/US2018/046077, dated Dec. 19, 2018, 10 pages.
Notification of Transmittal of the Written Opinion of the International Searching Authority, or the Declaration; PCT/US2018/046079; dated Jan. 2, 2019, 10 pages.
U.S. Appl. No. 16/357,175, filed Mar. 18, 2019; Non-Final Office Action dated May 16, 2019; 49 pages.
U.S. Appl. No. 16/357,194, filed Mar. 18, 2019; Non-Final Office Action dated May 17, 2019; 51 pages.
U.S. Appl. No. 16/357,223, filed Mar. 1, 2019; Non-Final Office Action dated May 23, 2019; 11 pages.
U.S. Appl. No. 16/357,227, filed Mar. 18, 2019; Non-Final Office Action dated May 23, 2019; 10 pages.
U.S. Appl. No. 16/357,234, filed Mar. 18, 2019; Non-Final Office Action dated May 24, 2019; 12 pages.
U.S. Appl. No. 16/357,238, filed Mar. 18, 2019; Non-Final Office Action dated May 28, 2019; 32 pages.
U.S. Appl. No. 16/357,250, filed Mar. 18, 2019; Non-Final Office Action dated May 24, 2019; 18 pages.
U.S. Appl. No. 16/357,270, filed Mar. 18, 2019; Non-Final Office Action dated Jun. 14, 2019; 16 pages.
U.S. Appl. No. 16/357,271, filed Mar. 18, 2019; Non-Final OA dated May 15, 2019; 7 pages.
U.S. Appl. No. 16/357,273, filed Mar. 8, 2019; Non-Final Office Action dated May 17, 2019; 8 pages.
U.S. Appl. No. 16/357,274, filed Mar. 18, 2019; Non-Final Office Action dated May 10, 2019; 7 pages.
U.S. Appl. No. 16/357,276, filed Mar. 18, 2019; Non-Final Office Action dated May 10, 2019; 7 pages.
U.S. Appl. No. 16/357,277, filed Mar. 18, 2019; Non-Final Office Action dated May 9, 2019; 9 pages.
U.S. Appl. No. 16/357,279, filed Mar. 18, 2019; Non-Final Office Action dated May 30, 2019; 9 pages.
U.S. Appl. No. 16/357,280, filed Mar. 18, 2019; Non-Final Office Action dated May 14, 2019; 8 pages.
U.S. Appl. No. 16/402,023, filed May 2, 2019; Non-Final Office Action dated May 30, 2019; 25 pages.
U.S. Appl. No. 16/402,029, filed May 2, 2019; Non-Final Office Action dated Jun. 13, 2019; 9 pages.
U.S. Appl. No. 16/402,035, filed May 2, 2019; Non-Final Office Action dated Aug. 8, 2019; 191 pages.
U.S. Appl. No. 16/357,141, filed Mar. 18, 2019; Interview Summary dated Jun. 17, 2019; 1-3 pages.
U.S. Appl. No. 16/357,238, filed Mar. 18, 2019; Interview Summary dated Jun. 26, 2019; 1-4 pages.
U.S. Appl. No. 16/357,250, filed Mar. 18, 2019; Interview Summary dated Jun. 17, 2019; 1-4 pages.
U.S. Appl. No. 16/357,274, filed Mar. 18, 2019; Interview Summary dated Jun. 5, 2019; 1-3 pages.
U.S. Appl. No. 16/357,276, filed Mar. 18, 2019; Interview Summary dated Jun. 5, 2019; 1-4 pages.
U.S. Appl. No. 16/357,277, filed Mar. 18, 2019; Interview Summary dated Jun. 3, 2019; 1-4 pages.
U.S. Appl. No. 16/357,279, filed Mar. 18, 2019; Interview Summary dated Jun. 19, 2019; 1-4 pages.
U.S. Appl. No. 16/357,280, filed Mar. 18, 2019; Interview Summary dated Jun. 17, 2019; 1-3 pages.
U.S. Appl. No. 16/357,141, filed Mar. 18, 2019; Non-Final Office Action dated May 16, 2019; 17 pages.
U.S. Appl. No. 16/357,243, filed Mar. 18, 2019; Non-Final Office Action dated Jun. 3, 2019; 24 pages.
U.S. Appl. No. 16/357,282, filed Mar. 18, 2019; Non-Final Office Action dated Jun. 27, 2019; 19 pages.
U.S. Appl. No. 16/357,251, filed Mar. 18, 2019; Non-Final Office Action dated Aug. 1, 2019; 186 pages.
Varjabedian et al.; Design U.S. Appl. No. 29/659,571, filed Aug. 9, 2018; Food Preparation Device, User Interface, and Part Thereof.
Chinese Application No. 201910557420.2 filed Aug. 9, 2018; Office Action with English translation dated Feb. 21, 2020; pp. 1-21.
Chinese Application No. 2019105630895 filed Aug. 9, 2018; Office Action with English translation dated Feb. 3, 2020; pp. 1-13.
Chinese Application No. 2019105637856 filed Feb. 8, 2019; Office Action with English translation dated Dec. 3, 2019; pp. 1-11.
Civil Action No. 19-cv-24114, U.S. District Court, Southern District of Florida; Complaint Plaintiff SharkNinja Operating LLC for Compaint for Patent Infringement and Demand for Jury Trial against Defendants Fristar Products, Inc. and Emeril Lagasse (Entered: Oct. 4, 2019) pp. 1-194.
Civil Action No. 19-cv-24114, U.S. District Court, Southern District of Florida; Defendant Emeril Lagasse's Motion to Dismiss for Improper Venue; *SharkNinja Operating LLC* (Plaintiff) v. *Tristar Products, Inc. and Emeril Lagasse* (Defendants); Document 24 (Entered: Nov. 29, 2019) pp. 1-6.
Civil Action No. 19-CV-24114, U.S. District Court, Southern District of Florida; Defendant Fristar Products Inc.'S Answer to Plaintiff's Complaint and Counterclaims; *SharkNinja Operating LLC* (Plaintiff) v *Emeril Lagasse* (Defandant) and *Tristar Products, Inc.* (Defandant/Counterclaim Plaintiff) v *SharkNinja Operating LLC,*

(56) References Cited

OTHER PUBLICATIONS

*Daniel R. Gibson, Cantor Colburn LLP, Pedro Lopez-Baldrich* (Counterclaim Defendants) Document 25 (Entered: Nov. 29, 2019) pp. 1-36.
First Office Action with English Translation; Chinese Application No. 201910562983.0; Action dated Jan. 2, 2020; pp. 1-17.
Hip Cooking, [online]; [retrieved on Nov. 25, 2019]; retrieved from the Internethttps://www.hippressurecooking.com/pressure-cooker-psi-faq-the-stuff-you-didnt-think-to-ask/Laura Pazzaglia, "Pressure Cooker PSI FAQ: The Stuff You Didn't Think to Ask about Pressure," Hip Cooking, Apr. 7, 2013, pp. 1-26.
International Preliminary Report on Patentability for International Application No. PCT/US18/046077, dated Feb. 20, 2020, 14 pages.
International Preliminary Report on Patentability for International Application No. PCT/US2018/046079, dated Feb. 20, 2020, 11 pages.
U.S. Appl. No. 16/059,876, filed Aug. 9, 2018; Third Party Submission Under 37 CFR 1.290 dated Feb. 20, 2020; 15 pages.
U.S. Appl. No. 16/548,562, filed Aug. 22, 2019; Third Party Submission Under 37 CFR 1.290 dated Feb. 19, 2020; 15 pages.
U.S. Appl. No. 16/357,270, filed Mar. 18, 2019; Final Office Action dated Dec. 2, 2019; pp. 1-20.
U.S. Appl. No. 16/357,141, filed Mar. 18, 2019; Non-Final Office Action dated Jan. 28, 2020; 22 pages.
U.S. Appl. No. 16/357,238, filed Mar. 18, 2019; Non-Final Office Action dated Feb. 26, 2020; 26 pages.
U.S. Appl. No. 16/357,280, filed Mar. 18, 2019; Non-Final Office Action dated Feb. 4, 2020; pp. 1-9.
U.S. Appl. No. 16/402,029, filed May 2, 2019; Final Office Action dated Dec. 31, 2019; pp. 1-6.
U.S. Appl. No. 16/402,023, filed May 2, 2019; Non-Final Office Action dated Feb. 27, 2020; 25 pages.
U.S. Appl. No. 16/671,709, filed Nov. 1, 2019; Non-Final Office Action dated Jan. 8, 2020; pp. 1-5.
U.S. Appl. No. 16/671,972, filed Nov. 1, 2019; Non-Final Office Action dated Dec. 18, 2019; pp. 1-5.
U.S. Appl. No. 16/357,223, filed Mar. 18, 2019; Final Office Action dated Oct. 3, 2019; 1-7 pages.
U.S. Appl. No. 16/559,174, filed Sep. 3, 2019; Non-Final Office Action dated Oct. 11, 2019; 1-10 pages.
DeLonghi, [online]; [retrieved on Mar. 18, 2019]; retrieved from the Internet https://www.delonghi.com/en-us/products/kitchen/kitchen-appliances/low-oil-fryer-and-multicooker/multifry-fh1163 1bk-0125392006?TabSegment=support#supportDeLonghi, "FH1163 FH1363 MultiFry", DeLonghi Instruction Manual, www.delonghi.com, 5712511041/05.15, pp. 1-11.
U.S. Appl. No. 16/357,238, filed Mar. 18, 2019; Non-Final Office Action dated Jan. 14, 2021; 74 pages.
U.S. Appl. No. 17/139,599, filed Dec. 31, 2020; Non-Final Office Action dated Feb. 23, 2021; 9 pages.
U.S. Appl. No. 17/139,602, filed Dec. 31, 2020; Non-Final Office Action dated Feb. 22, 2021; 33 pages.
U.S. Appl. No. 16/671,972, filed Nov. 1, 2019; Final Office Action dated Feb. 24, 2021; 59 pages.
U.S. Appl. No. 17/139,236, filed Dec. 31, 2020; Non-Final Office Action dated Mar. 8, 2021; 307 pages.
U.S. Appl. No. 17/139,283, filed Dec. 31, 2020; Non-Final Office Action dated Mar. 10, 2021; 309 pages.
U.S. Appl. No. 17/139,314, filed Dec. 31, 2020; Non-Final Office Action dated Mar. 23, 2021; 310 pages.
U.S. Appl. No. 17/139,572, filed Dec. 31, 2020; Non-Final Office Action mailed Mar. 11, 2021; 292 pages.
U.S. Appl. No. 16/357,141, filed Mar. 18, 2019; Final Office Action dated Aug. 30, 2019; 20 pages.
U.S. Appl. No. 16/357,250, filed Mar. 18, 2019; Final Office Action dated Sep. 13, 2019; 1-14 pages.
U.S. Appl. No. 16/357,280, filed Mar. 18, 2019; Final Office Action dated Sep. 13, 2019; 1-11 pages.
U.S. Appl. No. 16/357,175, filed Mar. 18, 2019; Final Office Action dated Sep. 30, 2019; 1-17 pages.
U.S. Appl. No. 16/357,194, filed Mar. 18, 2019; Final Office Action dated Sep. 30, 2019; 1-17 pages.
U.S. Appl. No. 16/357,238, filed Mar. 18, 2019; Final Office Action dated Oct. 8, 2019; 1-13 pages.
U.S. Appl. No. 16/357,243, filed Mar. 18, 2019; Notice of Allowance dated Oct. 15, 2019; pp. 1-9.
U.S. Appl. No. 16/402,023, filed May 2, 2019; Final Office Action dated Oct. 28, 2019; 1-27 pages.
U.S. Appl. No. 16/548,562, filed Aug. 22, 2019; Non-Final Office Action dated Oct. 25, 2019; 1-20 pages.

* cited by examiner

GUARD FOR COOKING SYSTEM

CROSS-REFERENCE TO RELATED APPLICATIONS

This application is claims priority to U.S. Provisional Application Ser. No. 62/810,254, filed Feb. 25, 2019, the entire contents of which are incorporated herein by reference.

BACKGROUND

Embodiments of the present disclosure relate generally to a cooking system, and more particularly, to a guard for blocking a flow of fat or oil from contacting a heating element of a cooking system.

SUMMARY

According to an embodiment, a cooking system including a housing having a hollow interior, a heating element associated with said housing, a support body for supporting the food within said hollow interior such that the food is positionable on a support surface of said support body, and a guard located between at least a portion of the support surface and said heating element. The guard is permissive of convective airflow between said hollow interior and said heating element, and is generally impermeable to projectile matter generated during a cooking operation.

According to yet another embodiment, a cooking system includes a housing having a hollow interior, a first heating element associated with said housing and operable in a first cooking mode, a second heating element associated with said housing and operable in a second cooking mode, and a guard configurable with said housing to be permissive of convective airflow between said hollow interior and said heating element during said first cooking mode, and non-permissive of convective airflow between said hollow interior and said heating element during said second cooking mode.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
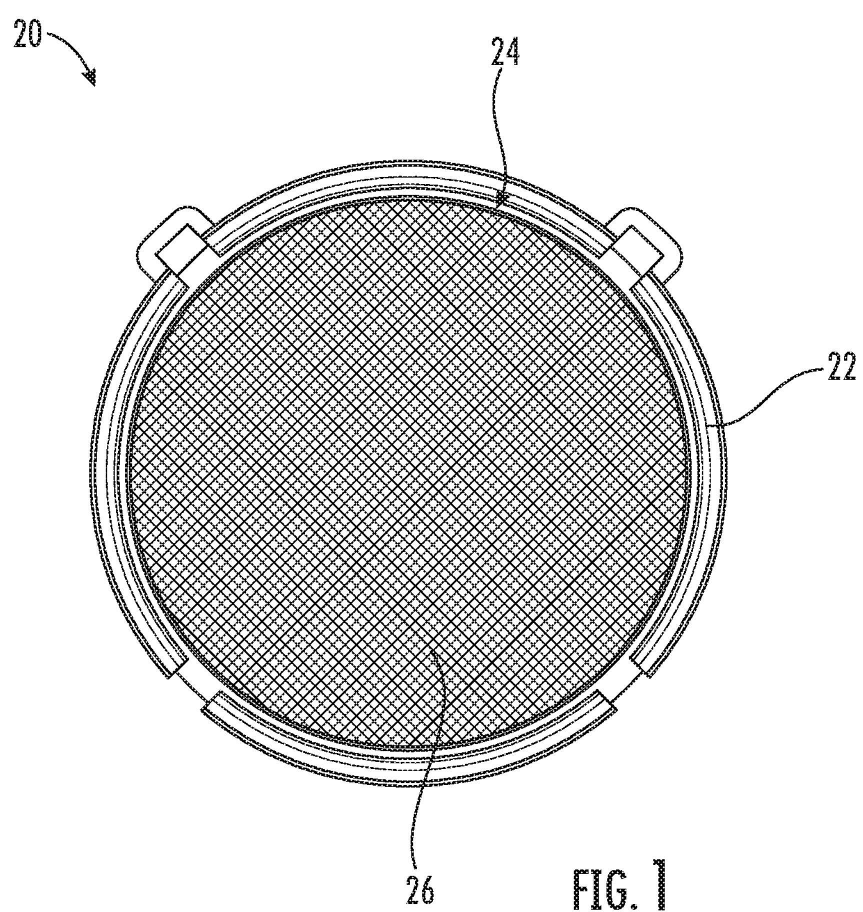
FIG. 1 is a plan view of a guard for use with a cooking system according to an embodiment.
Figure 2:
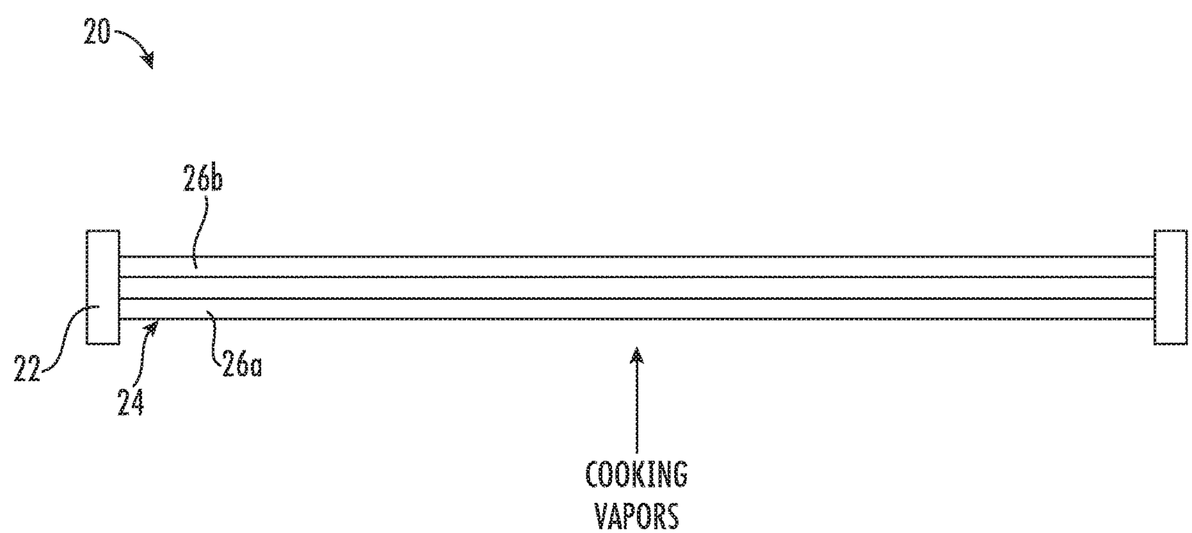
FIG. 2 is a schematic view of the guard of FIG. 1 according to an embodiment.

With reference now to FIGS. 1 and 2, an example of a guard 20 for use during a cooking operation is illustrated. As shown, the guard 20 includes a frame 22 and a body 24 formed from at least one layer of material 26 mounted within the frame 22. In the illustrated, non-limiting embodiment, the body 24 includes a first layer 26*a* and a second layer 26*b* (FIG. 2). However, it should be understood that a guard 20 having a body 24 including only single layer of material, or alternatively, more than two layers of material are also within the scope of the disclosure.

The at least one layer 26 of the body 24 is permeable to air and water vapor. The layer 26 may be selected from any suitable heat-resistant material. In an embodiment, the material used to form one or more of the layers 26 of the body 24 is a non-absorbent material, such as a metal wire mesh for example. The configuration of the mesh, such as the size of the apertures of the mesh for example, is selected such that projectile matter generated during a cooking operation, such as fat or oil for example, is substantially blocked from passage through the apertures. However, the sizes of the apertures may also be selected to allow a flow of air and heat, sufficient for performing a convective cooking operation for example, to pass through the material. In an embodiment using two layers, the mesh material of each layer 26*a* and 26*b* may be formed from a braided or welded metal wire having a diameter of 0.4 mm to 0.5 mm, with openings of 0.8 mm to 2.1 mm. More specifically, each layer 26*a* and 26*b* may be formed from a braided or welded metal wire having a diameter of about 0.45 mm, with openings of about 1.5 mm. The layers 26*a* and 26*b* may be aligned such that the openings between the overlapping layers are 0.4 mm to 2.1 mm, and more specifically 0.4 mm to 1.5 mm, 0.4 mm to 0.75 mm, and 0.75 mm to 1.5 mm.

Heat-resistant, non-absorbent materials that are non-metallic, such as silicone for example, are also within the scope of the disclosure. In such embodiments, the layer 26 may similarly have a plurality of openings or apertures formed therein. Further, any material that is capable of being chemically treated to achieve desired heat-resistant and non-absorbent properties is also within the scope of the disclosure.

Alternatively, in addition to being vapor-permeable, the material of one or more of the layers of the body may be liquid or grease-absorbent. Examples of such materials, includes, but are not limited to, a vapor-permeable cloth, such as a textile cloth, or a cellulose cloth. The various types of materials illustrated and described herein are intended as an example only, and it should be understood that any material suitable to block a flow of projectile matter is contemplated herein.

With reference to FIG. 2, in embodiments where the body 24 of the guard 20 includes multiple layers, the plurality of layers of material 26 are stacked along a flow path of cooking vapors generated during a cooking operation. Although the first and second layers 26*a*, 26*b* are shown as being spaced from one another along the flow path, embodiments where adjacent layers are arranged in direct contact with one another are also contemplated herein.

Each of the layers 26 of the body 24 may be formed from a similar material or a different material. In addition, the layers 26 may have similar or different configurations and/or orientations. For example, a gauge of a first layer 26*a* of mesh may be different than the gauge of a second layer 26*b* of mesh. Further, the first and second layers 26*a*, 26*b* may be arranged such that apertures of the first layer 26*a* are generally aligned with the apertures of the second layer 26*b*. Alternatively, the material of the second layer 26*b* may be shifted or rotated relative to the material of the first layer 26*a* such that the apertures of the first layer 26*a* are staggered or offset from the apertures of the second layer 26*b*. In such embodiments, the apertures of the first layer 26*a* and the apertures of the second layer 26*b* cooperate to define an open area of the body 24 through which a fluid, such as air or vapor, may pass.

A configuration of the body 24 may be adjustable to control the permeability of the body 24, for example based on the cooking operation being performed. In an embodiment, a configuration of one or more layers 26 may be adjustable to achieve any configuration of the body 24 between a fully open configuration and a fully closed configuration. In the fully open configuration, the body 24 may be permeable not only to cooking vapors and air flow, but also projectile material, and in the fully closed configuration, the body 24 may be impermeable to all flows including projectile matter, cooking vapors, air, and heat. In an embodiment, a position of one or more layers 26 of the body 24 is adjustable to control the permeability of the body 24. For example, one or more of the layers 26 may be rotatable relative to another of the layers 26 of the body 24 to selectively increase or decrease the open area of the body 24 through which cooking vapors may flow. In embodiments including two or more layers 26 with openings or apertures, at least one of the layers 26 is movable to align the openings of adjacent layers, thereby increasing the open area of the body 24. Similarly, one or more of the layers 26 is movable to stagger or offset the openings of adjacent layers 26, thereby reducing the permeable area of body 24.

Alternatively, or in addition, one or more layers 26 of the body 24 may be selectively removable to adjust the permeability of the body 24. For example, elimination of one of a plurality of layers 26 of the body 24 may increase the open area through which cooking vapors may flow. Similarly, one or more layers 26 may be added to the body 24 to further reduce the open area of the body 24, thereby restricting a flow there through.

Figure 3:
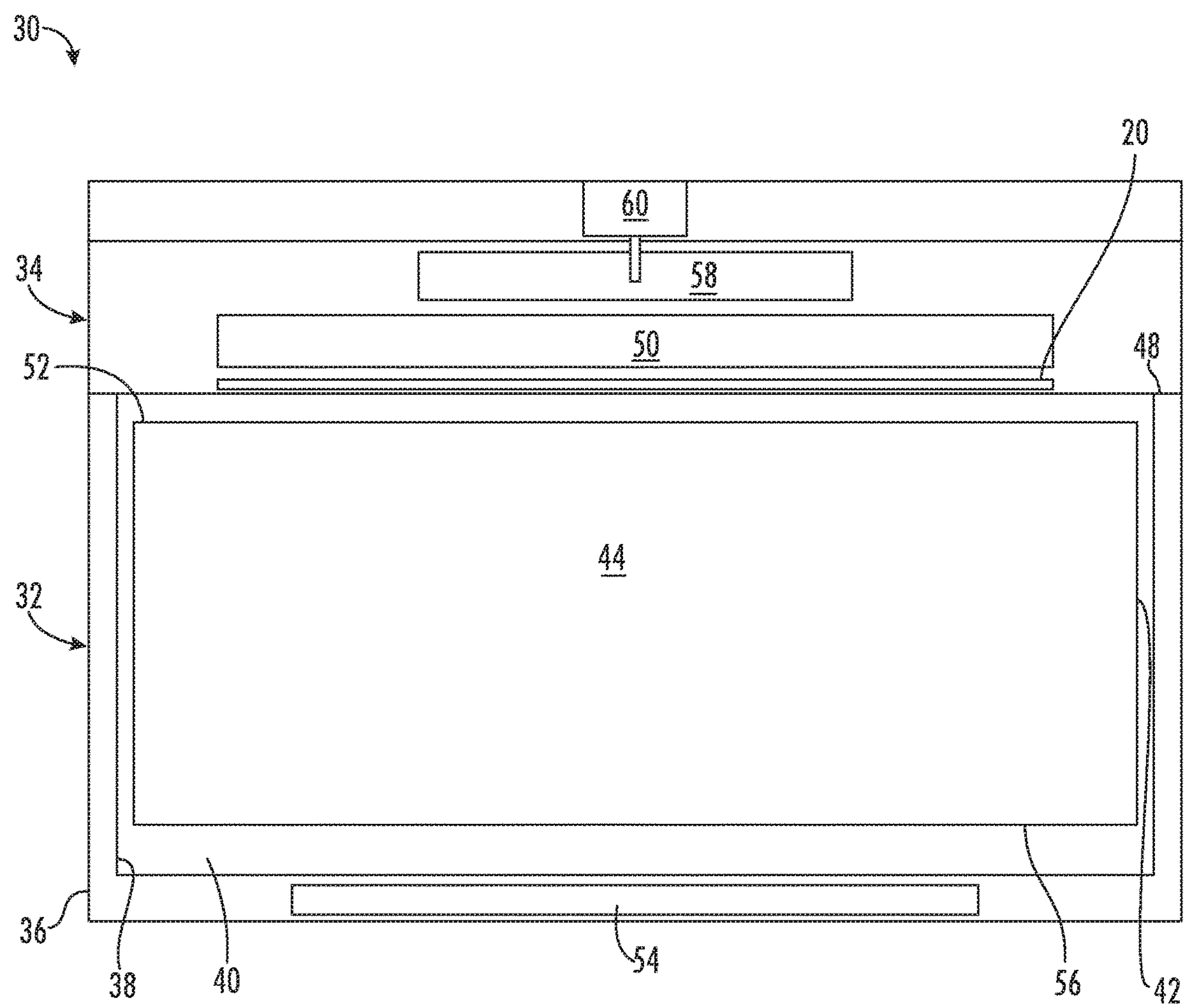
FIG. 3 is a schematic diagram of a cooking system including a guard according to an embodiment.

In an embodiment, the guard 20 is suitable for use within a countertop cooking system 30. An example of a cooking system 30 is illustrated in more detail in FIG. 3. As shown, the cooking system 30 includes a base 32 and a lid 34. The base 32 includes a housing 36 made of any suitable material, such as glass, aluminum, plastic, or stainless steel for example. A liner 38 may be disposed within the hollow interior 40 of the housing 36. The liner 38 may be formed from any suitable conductive material, such as aluminum for example. In an embodiment, the liner 38 forms an interior surface of the housing 36 and thereby defines the hollow interior 40 of the housing 36. Alternatively, the liner 38 may be offset from the interior surface of the housing 36. However, it should be understood that other components of the cooking system 30, or surfaces thereof, may also define the hollow interior 40.

A cooking container 42 is receivable within the hollow interior 40 of the housing 36. Although the cooking container 42 is described herein as being removable from the housing 36 of the base 32, embodiments where the cooking container 42 is integrally formed with the housing 36 are also contemplated herein. The cooking container 42, has an interior 44 designed to receive and retain one or more consumable products, such as food products for example, therein. Examples of food products suitable for use with the cooking system 30, include but are not limited to, meats, fish, poultry, bread, rice, grains, pasta, vegetables, fruits, and dairy products, among others. The cooking container 42 may be a pot formed from a ceramic, metal, or die cast aluminum material. In an embodiment, an interior surface of the cooking container 42 includes a nano-ceramic coating and an exterior surface of the cooking container 42 includes a silicone epoxy material. However, any suitable material capable of withstanding the high temperatures required for cooking food products is contemplated herein. Further, one or more handles 46 may be associated with the cooking container 42 to allow a user to easily grasp and manipulate the cooking container 42 relative to the housing 36.

One or more accessories, may be compatible for use with the cooking system 30. Examples of such accessories include, but are not limited to, a diffuser, a crisping insert, a grill plate, and a griddle for example. In such embodiments, the accessories may be receivable within the interior 40 of the housing 36, or alternatively, within the interior 44 of the cooking container 42.

Referring with more detail to the lid 34, it should be noted that the lid 34 is connectable to a surface of the cooking container 42 and/or housing 36 to close off entry to the interior 44 of the cooking container 42. Accordingly, a cooking volume may be defined between the interior 43 of the cooking container 42 and the closed lid 34, or alternatively, between the hollow interior 40 defined by the housing 36 and the closed lid 34. In an embodiment, a diameter of the lid 34 is generally complementary to a diameter of the housing 36 such that the lid 34 covers not only the cooking container 42, but also an upper surface 48 of the housing 36.

The lid 34 is movable relative to the base 32 between an open position and a closed position to selectively cover the hollow interior 40. For example, the lid 34 may be distinct and separable from the base 32, or the lid 34 may be movably connected to the base 32. In the illustrated, non-limiting embodiment, the lid 34 is pivotable or rotatable relative to the base 32 about a pivot axis P. However, other types or movement of the lid 34 are also within the scope of the disclosure. One or more fastening mechanisms (not shown) may, but need not be used to secure the lid 34 to the base 32 when the lid 34 is in the closed position. Any suitable type of fastening mechanism capable of withstanding the heat associated with the cooking system 30 is considered within the scope of the disclosure.

The cooking system 30 includes at least one heating element operable to impart heat to the cooking volume during one or more modes of operation of the cooking system 30. In the illustrated, non-limiting embodiment, a heating element 50 is positioned generally at or above an upper extent 52 of the cooking container 42, such as proximate a center of the interior 44 of the cooking container 42 for example. As shown, the at least one heating element 50 is mounted within the lid 34, and therefore completely outside of the cooking container 42, and vertically offset from the upper extent 52 thereof. Alternatively, or in addition, a heating element 54 may be disposed within the housing 36, generally adjacent the bottom 56 of the cooking container 42. However, it should be understood that embodiments where a heating element is arranged at another location within the base 32 and/or the lid 34 are also contemplated herein.

The at least one heating element 50, 54 may be capable of performing any suitable type of heat generation. For example, a heating element 50, 54 configured to heat the cooking container 42 or one or more food items located within the interior 44 of the cooking container 42 via conduction, convection, radiation, and induction are all within the scope of the disclosure. In the illustrated, non-limiting embodiment, the heating element 50 is operable to cook food within the cooking container 42 via a non-contact cooking operation. As used herein, the term "non-contact cooking operation" includes any cooking operation where a heating element or heat source is not arranged in direct or indirect contact with a food item, such as, but not limited to, convective and radiant heating. In such embodiments, the cooking system 30 additionally includes an air movement device 58, such as a fan for example, operable to circulate air within the cooking volume. The air is heated as it flows along its path of circulation, such as by flowing over a portion of the at least one heating element 50. In the illustrated, non-limiting embodiment, the air movement device 58 is driven by a motor 60 having a separate cooling mechanism coupled thereto.

In an embodiment, the heating element 54 is operable to cook food within the cooking container 42 via a contact cooking operation. As used herein, the term "contact cooking operation" includes a cooking operation where heat is transmitted via direct or indirect contact between a heating element or heat source and a food item, such as, but not limited to, conductive and inductive cooking. However, it should be understood that embodiments where the heating element 50 is operable to perform a contact cooking operation and embodiments where the heating element 54 is operable to perform a non-contact cooking operation are also within the scope of the disclosure.

Further, in embodiments including heating element 50 and heating element 54, it should be understood that the heating elements may be operable independently or in combination to apply one or more predetermined power settings to cook the food products within the cooking container. In operation, the heating elements 50, 54 may be capable of cooking the food independent of the loading of the food. In other words, the heating elements 50, 54 may be capable of cooking the food independent of the amount of food within the cooking container 42. The cooking operations that may be performed by the cooking system 30 include but are not limited to pressure cooking, steam cooking, slow cooking, searing, sautéing air frying, broiling, baking/roasting, dehydrating, and grilling.

Figure 4:
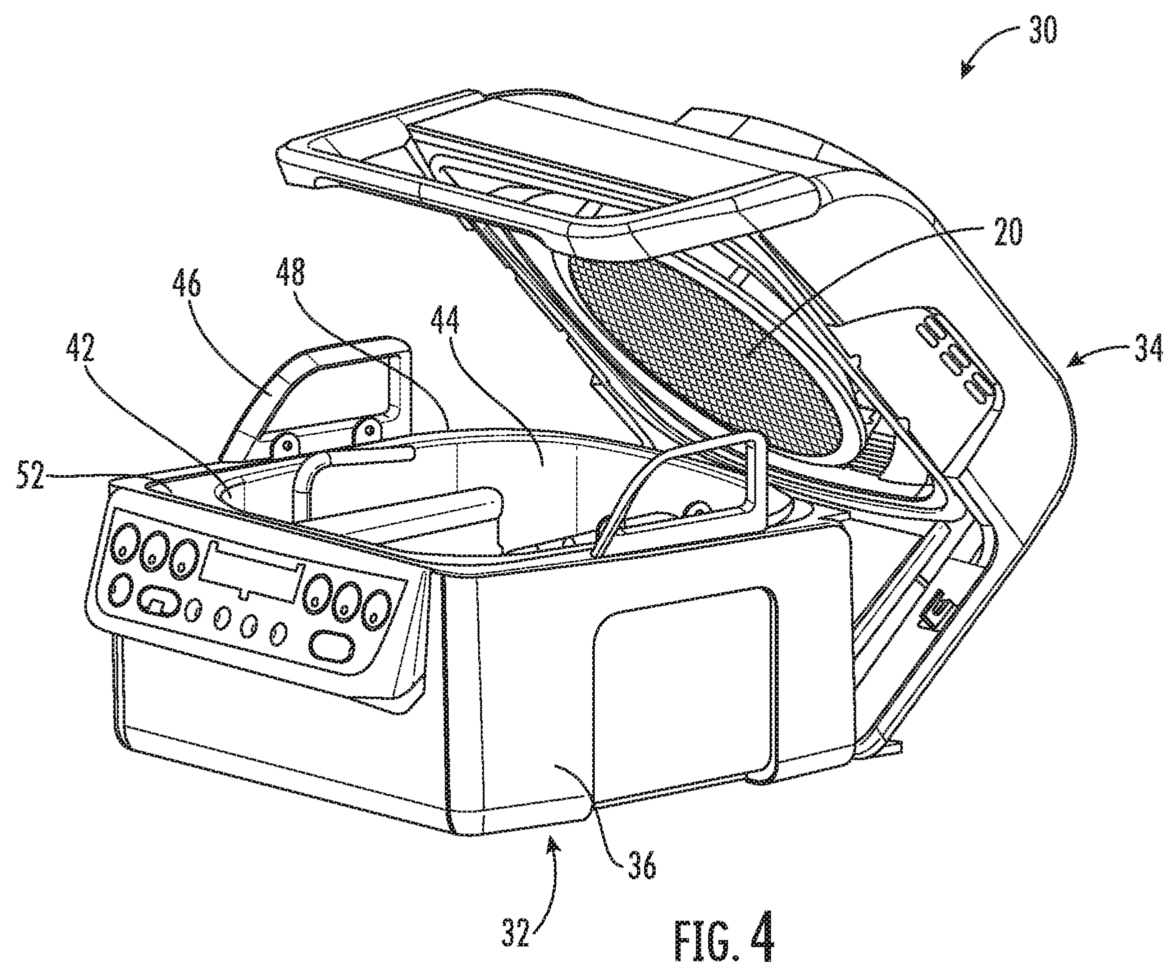
FIG. 4 is a front perspective view of a cooking system according to an embodiment.
Figure 5:
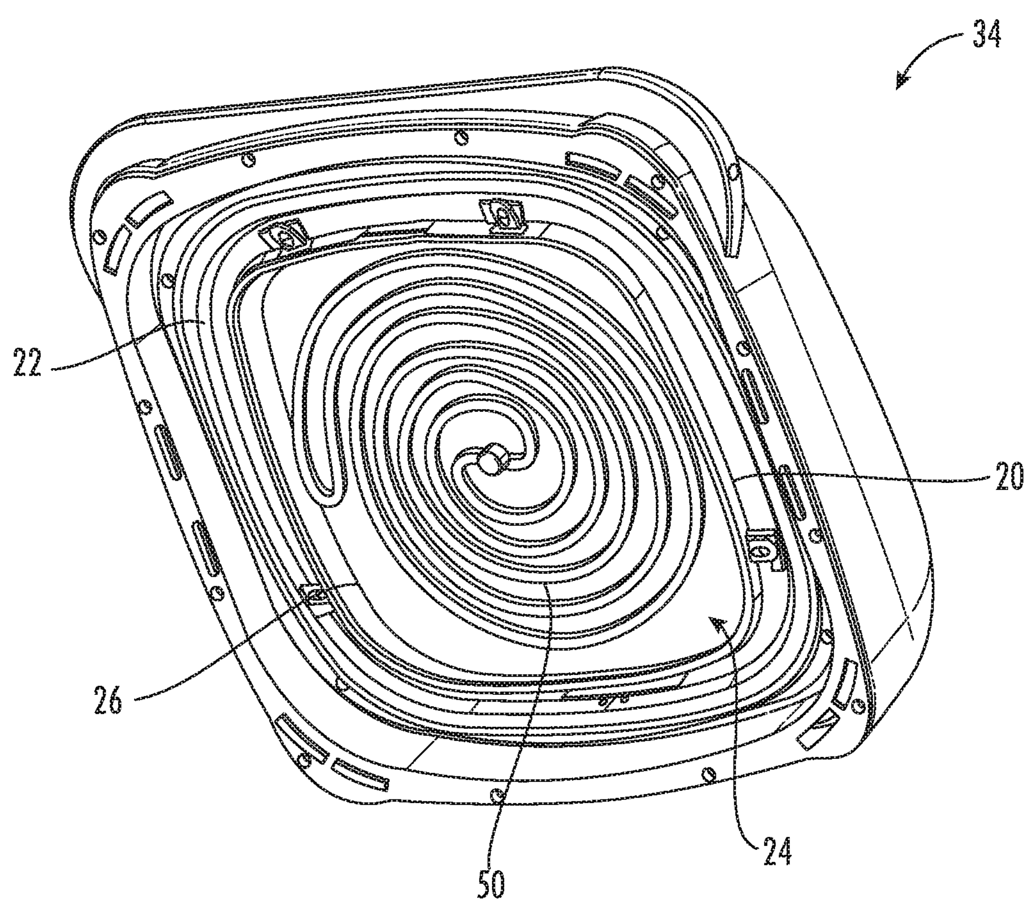
FIG. 5 is a perspective view of a lid of a cooking system according to an embodiment.

The guard 20 is mounted within the interior of the cooking system 30. The guard may be mounted via any suitable mounting mechanism, and may be removably or permanently arranged therein. As shown, the guard 20 may be located at any position between a food item being cooked within the cooking container 42 and a heating element 50, 54 of the cooking system 30. In the illustrated non-limiting embodiment, the guard is mounted within the lid 34 of the cooking system 30 adjacent heating element 50. As best shown in FIGS. 4 and 5, the body 24 of the guard 20 is sized such that body 24 substantially overlaps, and therefore protects, the entire surface of the heating element 50 facing the cooking volume. In an embodiment, a contour of the guard 20 is generally complementary to the shape of the heating element 50 that the guard is intended to protect. However, in other embodiments, best shown in FIG. 5, the contour of the guard 20 may be complementary to the lid 34.

As previously described, a permeability of the guard 20 may vary based on the cooking operation to be performed by the cooking system 30. In an embodiment, such as when the heating element 50 of the cooking system 30 is operational, the permeability of the guard 20 may be increased to allow air flow driven by the air movement device 58 to circulate through the guard 20. However, in such embodiments, the guard 20 is at least partially closed to restrict projectile matter generated during the cooking operation from contacting the heating element 50. By blocking at least a portion of the projectile matter generated during the cooking operation, smoke generation resulting from projectile matter contacting a hot heating element 50 is limited.

In embodiments where heating element 54 is operational, but heating element 50 is non-operational, it may be desirable to transform the guard to a fully closed position. For example, by closing off the heating element 50 (when non-operational) from communication with the interior 44 via the guard 20, the system can function in "wet" cooking modes (such as slow cooking, searing/sautéing, steaming, and pressure cooking) with lid 34 closed. If/when the guard 20 is impermeable to any fluid/air flow, the heater 50 is protected from projectiles and any steam that may travel up from the interior 44 during wet cooking modes. The guard 20 may then be transformed back into an open position (that still is generally impressible to grease and other projectiles but allows air/fluid flow from the interior 44 to the heating element 50) for "dry" cooking modes where fluid/air flow is beneficial (such as air frying, broiling, roasting/baking, dehydrating). As is discussed below, permeability adjustments (including full closing of heater 50 from the interior 44) may include adjustment of one, some, or all layers 26 and/or full removal and replacement of one, some, or all layers 26.

In an embodiment, the permeability of the guard 20 is adjusted prior to energizing any of the heating elements 50, 54 of the cooking system 30. Such adjustment may rotate or otherwise move one layer relative to another to block or otherwise decrease (via smaller size or non-linear pathway) the ability of particulate or in some cases fluid/air flow altogether from passing through the guard 20. In other embodiments, the guard 20 itself or layers 26 thereof may be removed from the cooking system 30 for some cooking operations and replaced for others (in some embodiments the guard 20 may be removed for dry modes and replaced for wet modes). In such embodiments, the guard 20 may simply be a plate without any openings that functions to removably cover the heating element 50 during the desired modes. Alternatively, the permeability of the guard 20 may be controlled during operation of the cooking system 30, automatically and in real time.

Figure 6:
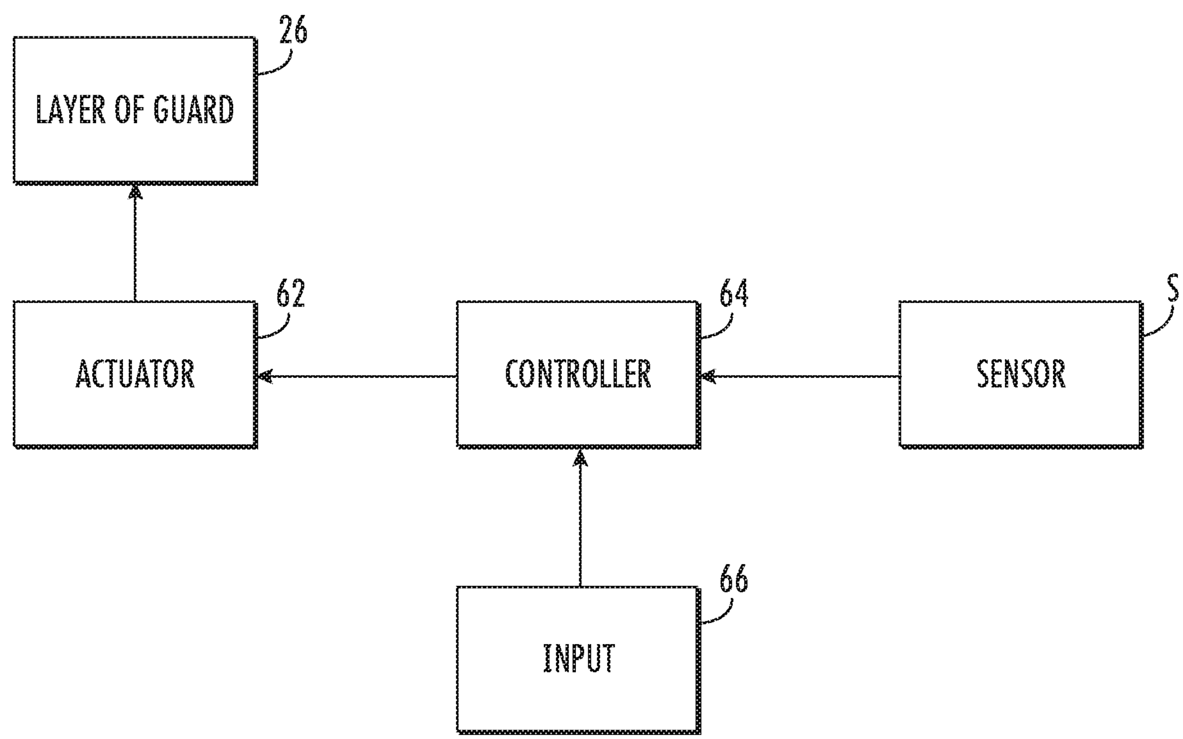
FIG. 6 is a schematic diagram of a control system associated with a guard of a cooking system according to an embodiment.

With reference now to FIG. 6, in an embodiment, one or more of the layers 26 of the body 24 is operably coupled to an actuator 62 or other movement mechanism. The cooking system 30 includes a controller 64 operably coupled to one or more inputs 66, such as buttons for example. The inputs 66 may be operable to select one of a plurality of modes of operation of the cooking system 30. In response to a mode of operation selected via an input 66, the controller 64 commands the actuator 62 to adjust of one or more of the layers 26 of the body 24 of the guard 20 to a desired configuration. Alternatively, or in addition, a sensor S for sensing one or more parameters within the cooking volume during a cooking operation may be operably coupled to the controller 64. In response to a condition detected within the cooking volume, such as reduced air flow for example, the controller 64 may command the actuator 62 to adjust a position of one or more of the layers 26 of the body 24.

The cooking system 30 having a guard 20 as illustrated and described herein has a reduced likelihood of smoking and grease splatter. As a result, the cooking system is easier for a user to operate and clean, thereby providing an enhanced user experience.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:

a housing having a hollow interior;

a cooking container configured to be receivable within the hollow interior;

a heating element associated with said housing and vertically aligned with and arranged above the cooking container;

a support body for supporting the food arranged within said cooking container and below the heating element such that the food is positionable on a support surface of said support body; and a guard having a body having a plurality of layers including at least a first layer and a second layer separated by an air gap, said guard located between at least a portion of the support surface and said heating element, wherein said guard is permissive of convective airflow between said hollow interior and said heating element, and selectively impermeable to solid and liquid projectile matter generated during a cooking operation, wherein said first layer includes a plurality of first openings and said second layer includes a plurality of second openings.

2. The cooking system of claim 1, wherein said first layer and said second layer are stacked relative to said convection flow.

3. The cooking system of claim 2, wherein said first layer and said second layer are identical.

4. The cooking system of claim 2, wherein said first layer is formed from a first material and said second layer is formed from a second material, distinct from said first material.

5. The cooking system of claim 2, wherein said first layer and said second layer are aligned.

6. The cooking system of claim 2, wherein said plurality of layers are connected via a frame and at least one of said plurality of layers is removably mounted to said frame.

7. The cooking system of claim 2, wherein at least one of said plurality of layers includes a mesh material formed from a wire defining a plurality of openings, wherein a diameter of said wire is between 0.4 mm to 0.5 mm, and a diameter of each of said plurality of openings is between 0.8 mm to 2.1 mm.

8. The cooking system of claim 7, wherein said wire has a diameter of about 0.45 mm.

9. The cooking system of claim 2, wherein said second layer is offset from said first layer.

10. The cooking system of claim 9, wherein said first openings and said second openings in combination form a plurality of overlapped openings, said overlapped openings having a diameter between 0.75 mm to 4 mm.

11. The cooking system of claim 10, wherein said overlapped openings have a diameter between 1.5 mm to 4 mm.

12. The cooking system of claim 10, wherein said overlapped openings have a diameter between 2.1 mm to 4 mm.

13. The cooking system of claim 10, wherein said overlapped openings have a diameter between 0.75 mm to 1.5 mm.

14. The cooking system of claim 10, wherein said cooking system further comprises an actuator operably coupled to a portion of said guard and a controller in communication with said actuator.

15. The cooking system of claim 14, further comprising an input for selecting a cooking mode operably coupled to said controller, wherein said permeability of said guard is automatically adjustable in response to said input.

16. The cooking system of claim 14, further comprising a sensor for detecting a parameter within said hollow interior, said sensor being operably coupled to said controller, wherein said permeability of said guard is automatically adjustable in response to said parameter detected by said sensor.

17. The cooking system of claim 1, wherein a permeability of said guard is manually adjustable.

18. The cooking system of claim 1, wherein a permeability of said guard is automatically adjustable by the cooking system.

19. The cooking system of claim 1, wherein said cooking system further comprises a lid movable relative to said housing and said heating element is disposed within said lid.

20. The cooking system of claim 19, wherein said guard is associated with said lid.

21. The cooking system of claim 1, wherein said guard is removably mounted within said cooking system.

* * * * *